United States Patent
Ryu et al.

(10) Patent No.: US 10,206,091 B2
(45) Date of Patent: Feb. 12, 2019

(54) METHOD FOR MONITORING UE REACHABILITY IN WIRELESS COMMUNICATION SYSTEM, AND DEVICE FOR SAME

(71) Applicant: LG ELECTRONICS INC., Seoul (KR)

(72) Inventors: Jinsook Ryu, Seoul (KR); Hyunsook Kim, Seoul (KR); Laeyoung Kim, Seoul (KR); Jaehyun Kim, Seoul (KR); Taehun Kim, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 15/503,092

(22) PCT Filed: Aug. 11, 2015

(86) PCT No.: PCT/KR2015/008393
§ 371 (c)(1),
(2) Date: Feb. 10, 2017

(87) PCT Pub. No.: WO2016/024789
PCT Pub. Date: Feb. 18, 2016

(65) Prior Publication Data
US 2017/0230817 A1    Aug. 10, 2017

Related U.S. Application Data

(60) Provisional application No. 62/035,510, filed on Aug. 11, 2014, provisional application No. 62/061,158, (Continued)

(51) Int. Cl.
*H04W 72/00* (2009.01)
*H04W 8/00* (2009.01)
(Continued)

(52) U.S. Cl.
CPC ............ *H04W 8/005* (2013.01); *H04W 8/02* (2013.01); *H04W 8/04* (2013.01); *H04W 24/08* (2013.01);
(Continued)

(58) Field of Classification Search
CPC ........ H04W 8/005; H04W 76/12; H04W 4/70
(Continued)

(56) References Cited

U.S. PATENT DOCUMENTS

2011/0256834 A1* 10/2011 Dayal ................... H04W 16/14
455/67.7
2013/0301501 A1  11/2013 Olvera-Hernandez et al.
(Continued)

FOREIGN PATENT DOCUMENTS

CN      103634849 A    3/2014
EP      2852211 A1     3/2015
(Continued)

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 12)", 3GPP TS 23.401 V12.5.0, (Jun. 2014).
(Continued)

*Primary Examiner* — Nghi H Ly
(74) *Attorney, Agent, or Firm* — Dentons US LLP

(57) ABSTRACT

Disclosed are a method and apparatus for monitoring User Equipment (UE) reachability in a wireless communication system. More specifically, a method for monitoring UE reachability in a wireless communication system comprises receiving, by a Mobile Management Entity (MME), a message for monitoring the UE reachability including UE reachability related indication from a Home Subscriber Server
(Continued)

(HSS); and allocating, by the MME, an Active Time to a UE, wherein the UE reachability related indication is used for setting the Active Time of the UE and wherein the UE reachability indication is used for the UE to stay reachable so that downlink data that a server wants to transmit to the UE can be transmitted to the UE.

7 Claims, 17 Drawing Sheets

Related U.S. Application Data filed on Oct. 8, 2014, provisional application No. 62/141,267, filed on Apr. 1, 2015.

(51) Int. Cl.
| | |
|---|---|
| *H04W 8/02* | (2009.01) |
| *H04W 24/08* | (2009.01) |
| *H04W 28/02* | (2009.01) |
| *H04W 76/12* | (2018.01) |
| *H04W 8/04* | (2009.01) |
| *H04W 64/00* | (2009.01) |
| *H04W 72/04* | (2009.01) |
| *H04W 72/12* | (2009.01) |
| *H04W 4/70* | (2018.01) |

(52) U.S. Cl.
CPC ......... *H04W 28/02* (2013.01); *H04W 64/003* (2013.01); *H04W 72/0446* (2013.01); *H04W 72/1289* (2013.01); *H04W 76/12* (2018.02); *H04W 4/70* (2018.02); *Y02D 70/00* (2018.01); *Y02D 70/1222* (2018.01); *Y02D 70/1224* (2018.01); *Y02D 70/1226* (2018.01); *Y02D 70/1242* (2018.01); *Y02D 70/1262* (2018.01); *Y02D 70/142* (2018.01); *Y02D 70/146* (2018.01); *Y02D 70/21* (2018.01); *Y02D 70/24* (2018.01)

(58) Field of Classification Search
USPC ....... 455/452.1, 450, 422.1, 434, 428, 432.3
See application file for complete search history.

(56) References Cited

U.S. PATENT DOCUMENTS

| | | | |
|---|---|---|---|
| 2015/0092554 A1* | 4/2015 | Mochizuki | H04W 24/10 370/235 |
| 2016/0142860 A1 | 5/2016 | Kim et al. | |
| 2017/0188303 A1* | 6/2017 | Bas Sanchez | H04W 52/0216 |

FOREIGN PATENT DOCUMENTS

| | | |
|---|---|---|
| JP | 2013219674 A | 10/2013 |
| KR | 10-2013-0080836 A | 7/2013 |
| KR | 10-2014-0043138 A | 4/2014 |
| WO | 2013001731 A1 | 1/2013 |
| WO | 2013/048175 A1 | 4/2013 |
| WO | 2013140743 A1 | 9/2013 |
| WO | 2014/052877 A1 | 4/2014 |
| WO | 2014061911 A1 | 4/2014 |

OTHER PUBLICATIONS

"3rd Generation Partnership Project; Technical Specification Group Services and System Aspects; Study on Machine-Type and other mobile data applications Communications enhancements (Release 12)," 3GPP TR 23.887 V22.0.0 (Dec. 2013).
HTC, "Overload handling by UE reachability interrogation from SCS," SA WG2 Meeting #S2-97, May 27-31, 2013, S2-131786.
Nokia Corporation, "Power Saving Mode optimisation," SA WG2 Meeting #100, Nov. 11-15, 2013, S2-134247, XP 050744305.
Intel Corporation, "Discussion on the introduction of Power Saving Mode in RAN specifications and related open aspects," 3GPP TSG RAN WG2 Meeting #85bis, Mar. 31-Apr. 4, 2014, R2-141210, XP 050792447.
"3rd Generation Partnership Project; Technical Specification Group Services and System Aspects; General Packet Radio Service (GPRS) enhancements for Evolved Universal Terrestrial Radio Access Network (E-UTRAN) access (Release 12)," 3GPP TS 23.401 V12.5.0 (Jun. 2014), XP 050774115.

* cited by examiner

[FIG. 1]
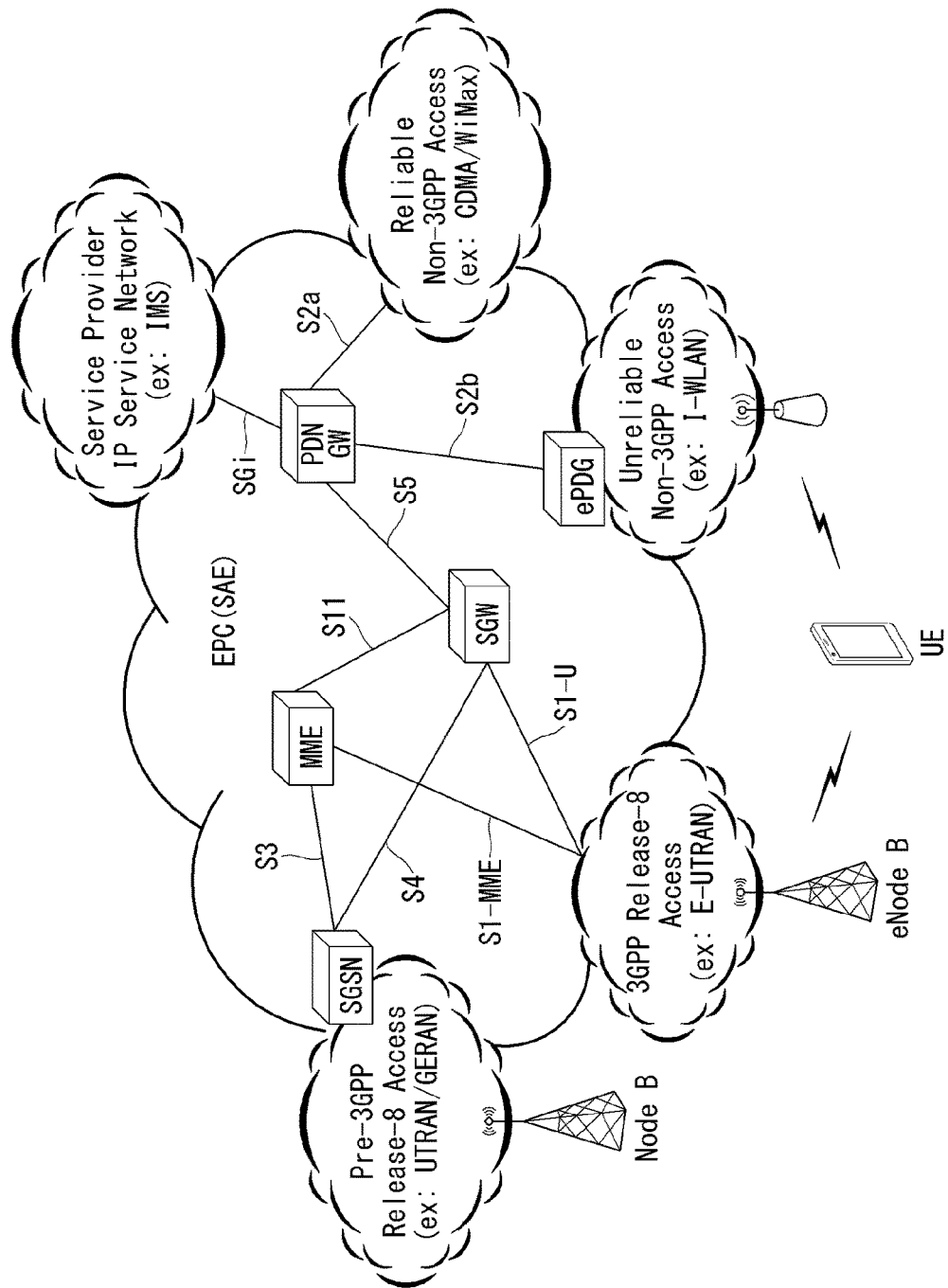

[FIG. 2]
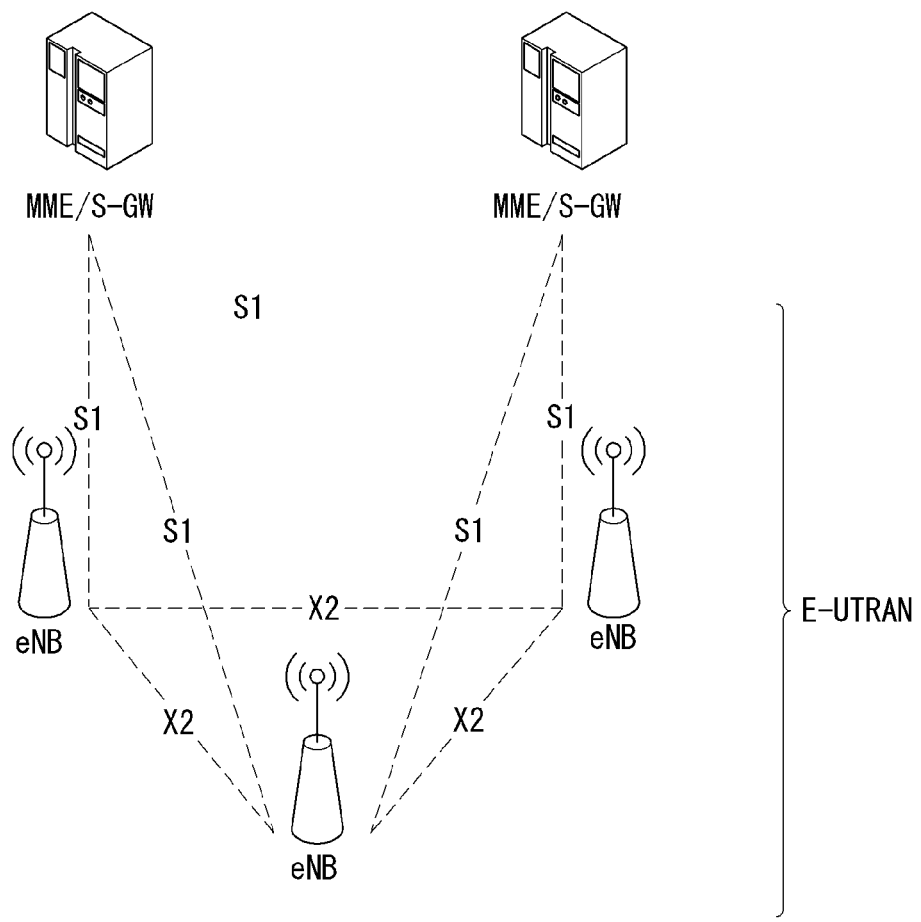

【FIG. 3】
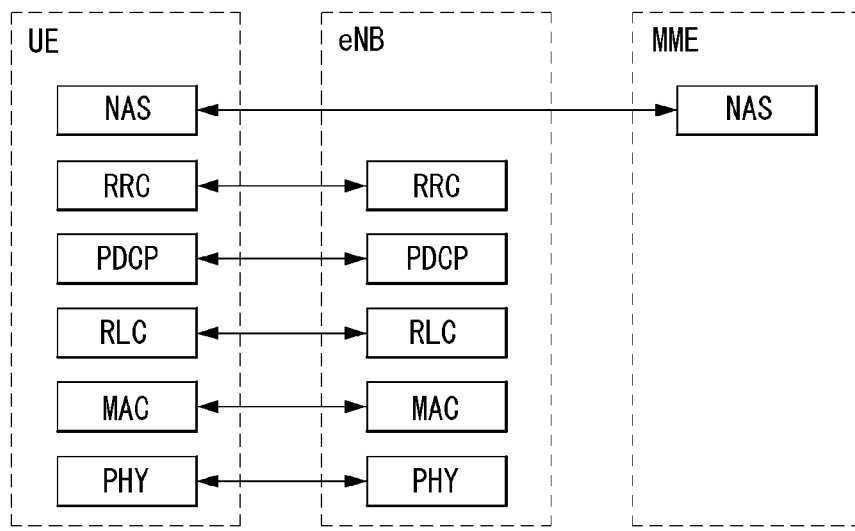
(a) Control Plane Protocol Stack
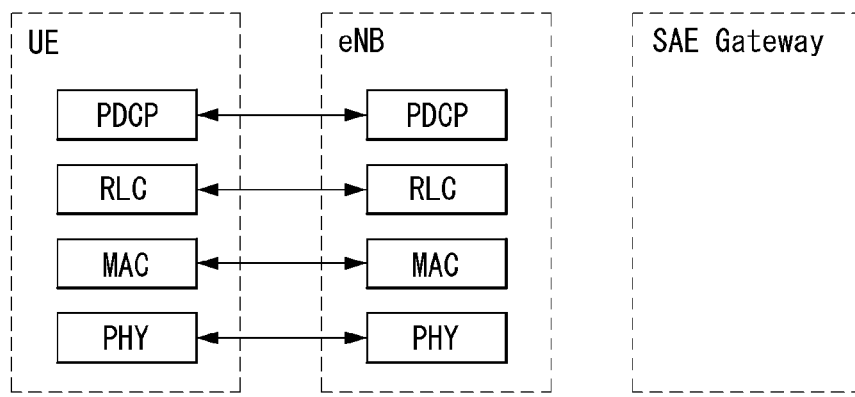
(b) User Plane Protocol Stack

[FIG. 4]
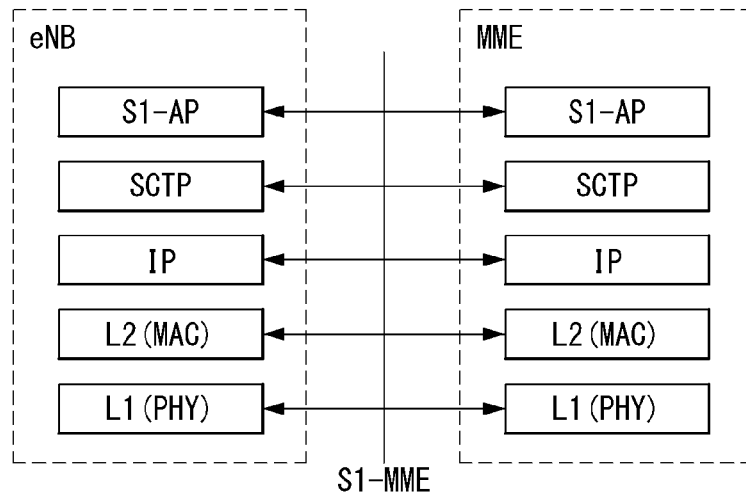
(a) control-plane protocol stack
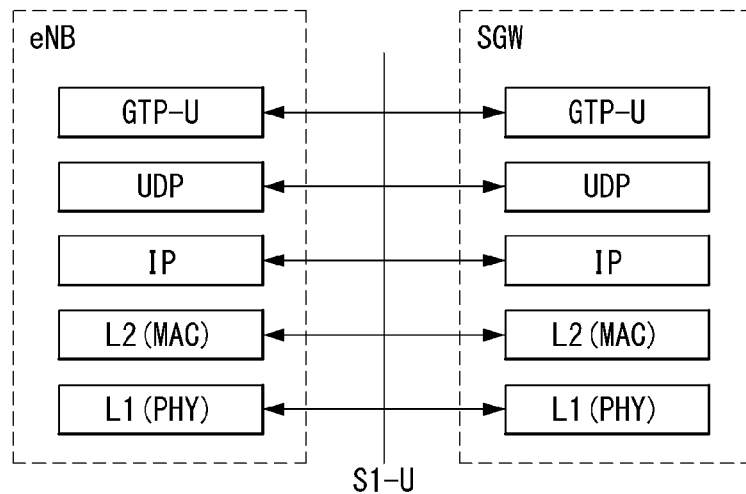
(b) user-plane protocol stack

[FIG. 5]
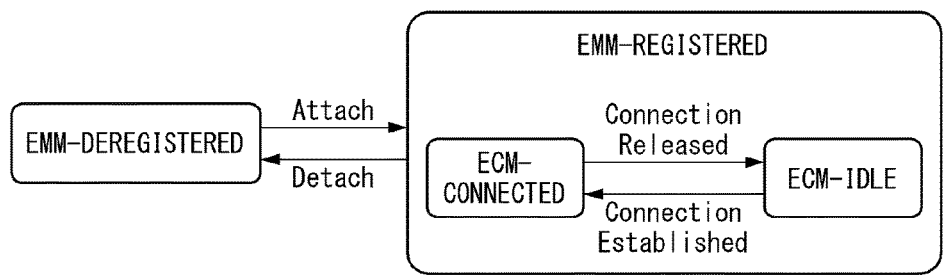
[FIG. 6]
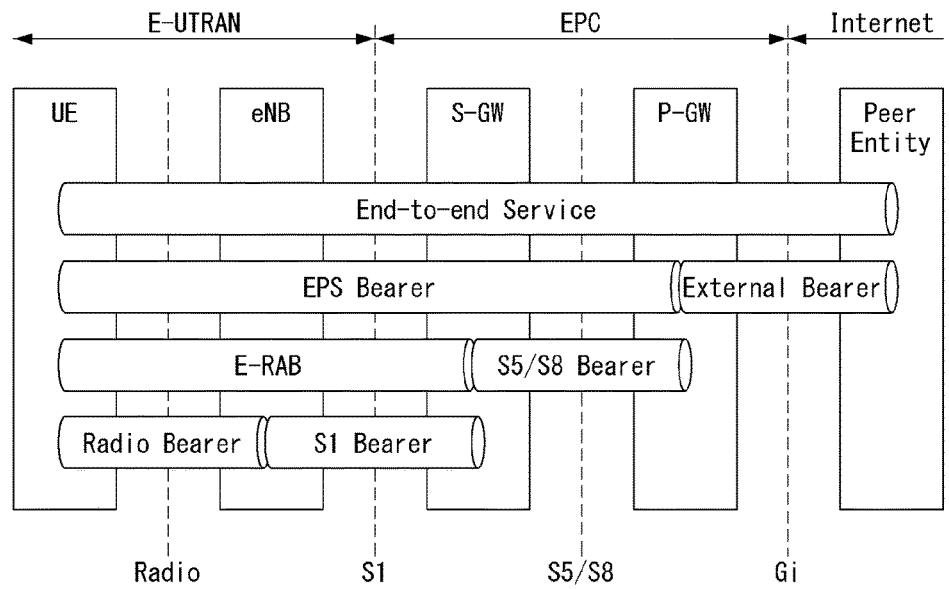

[FIG. 7]
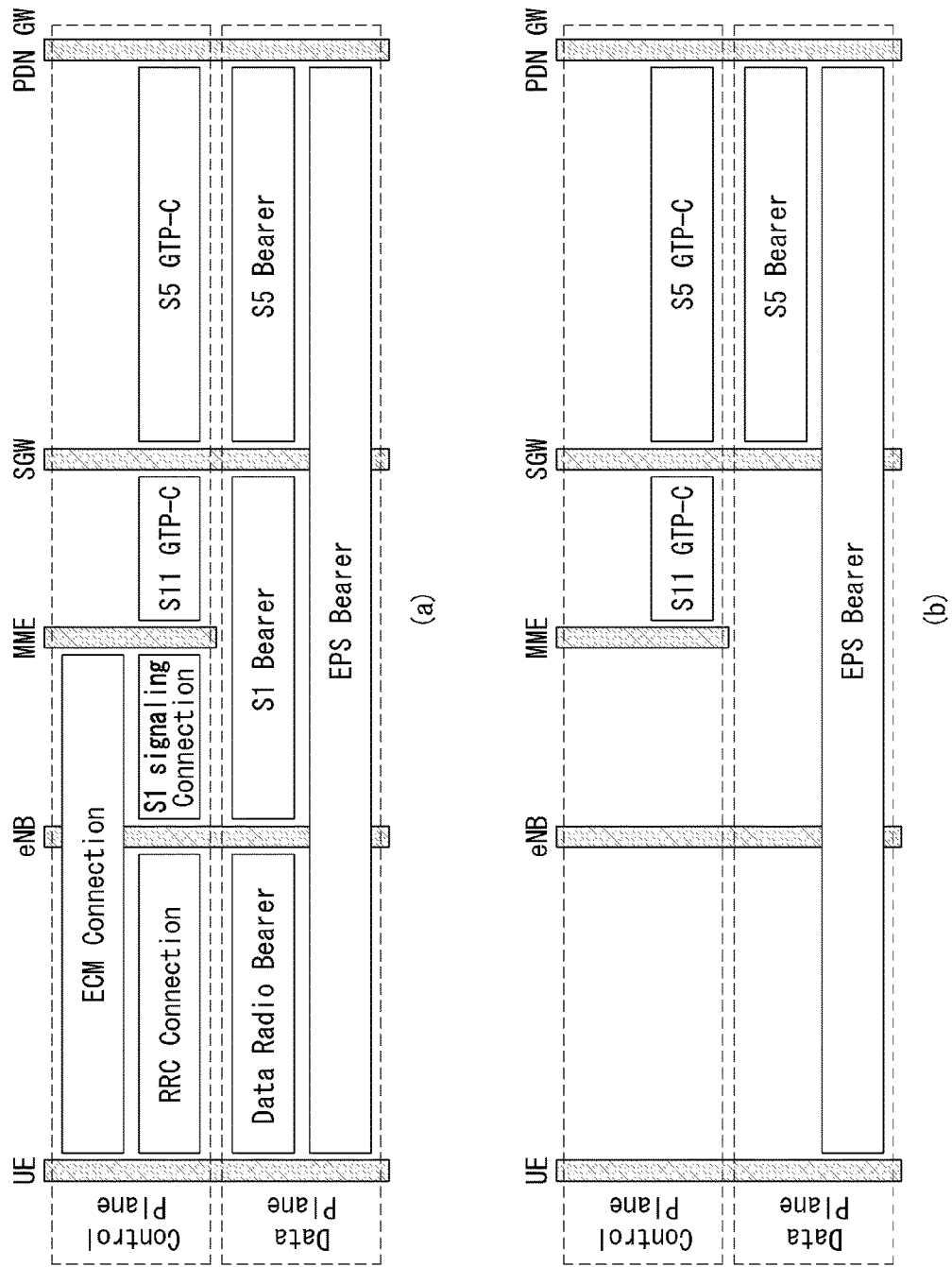

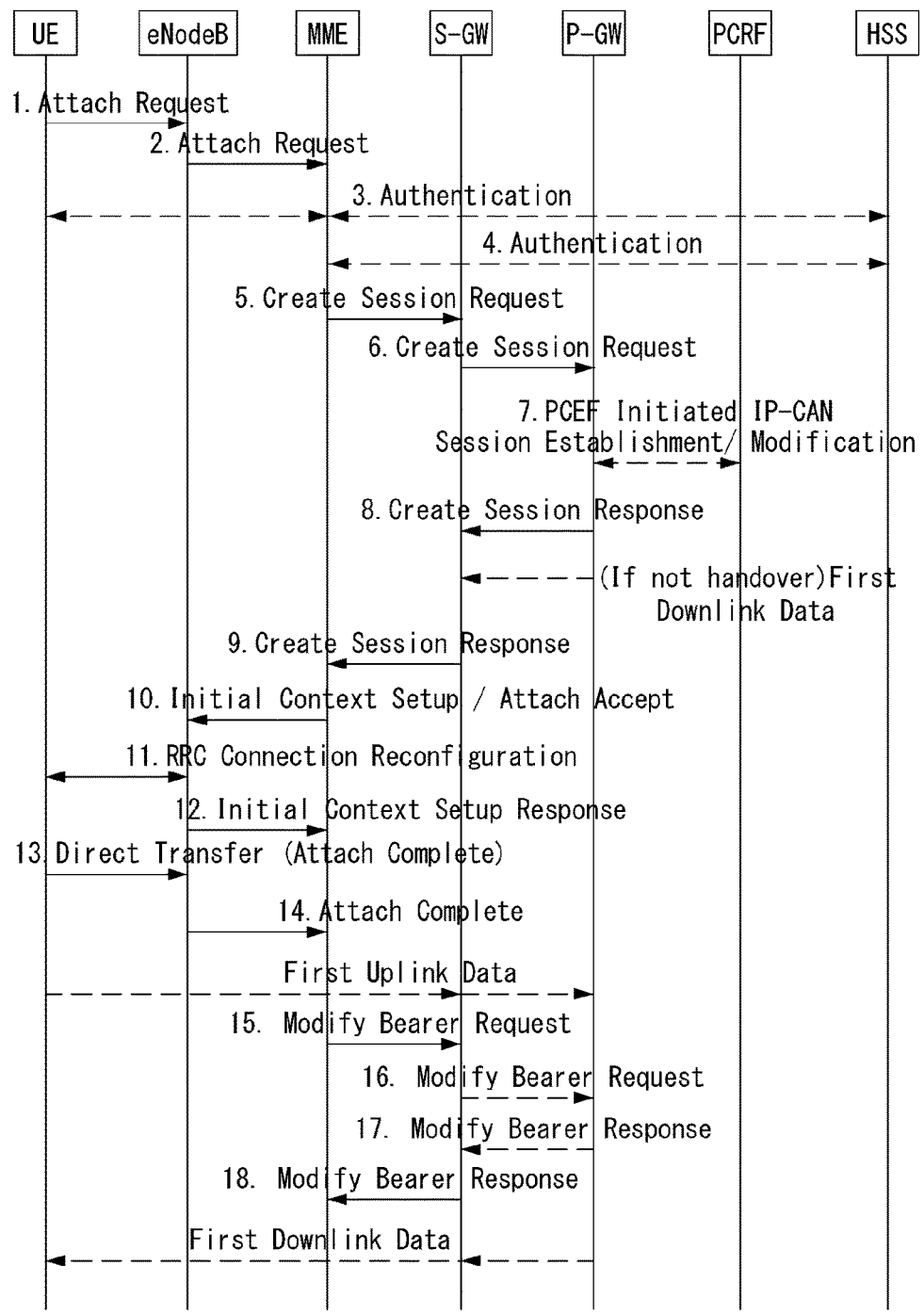

[FIG. 9]
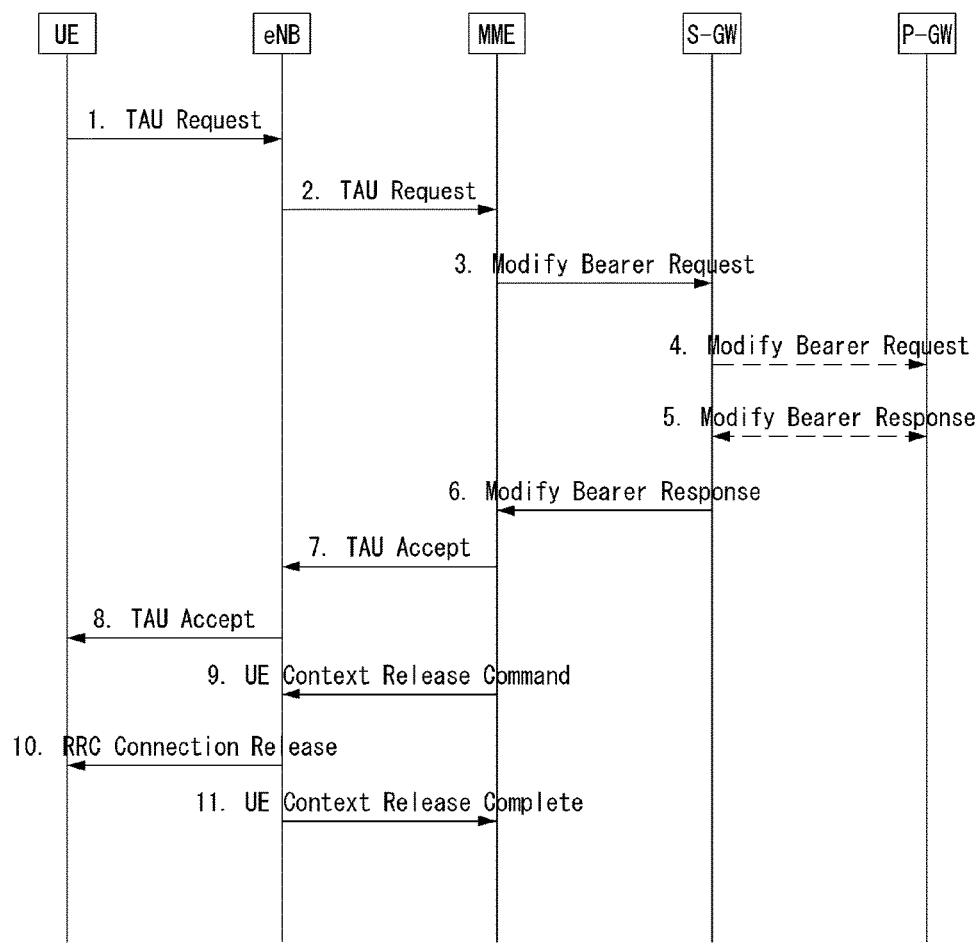

[FIG. 10]
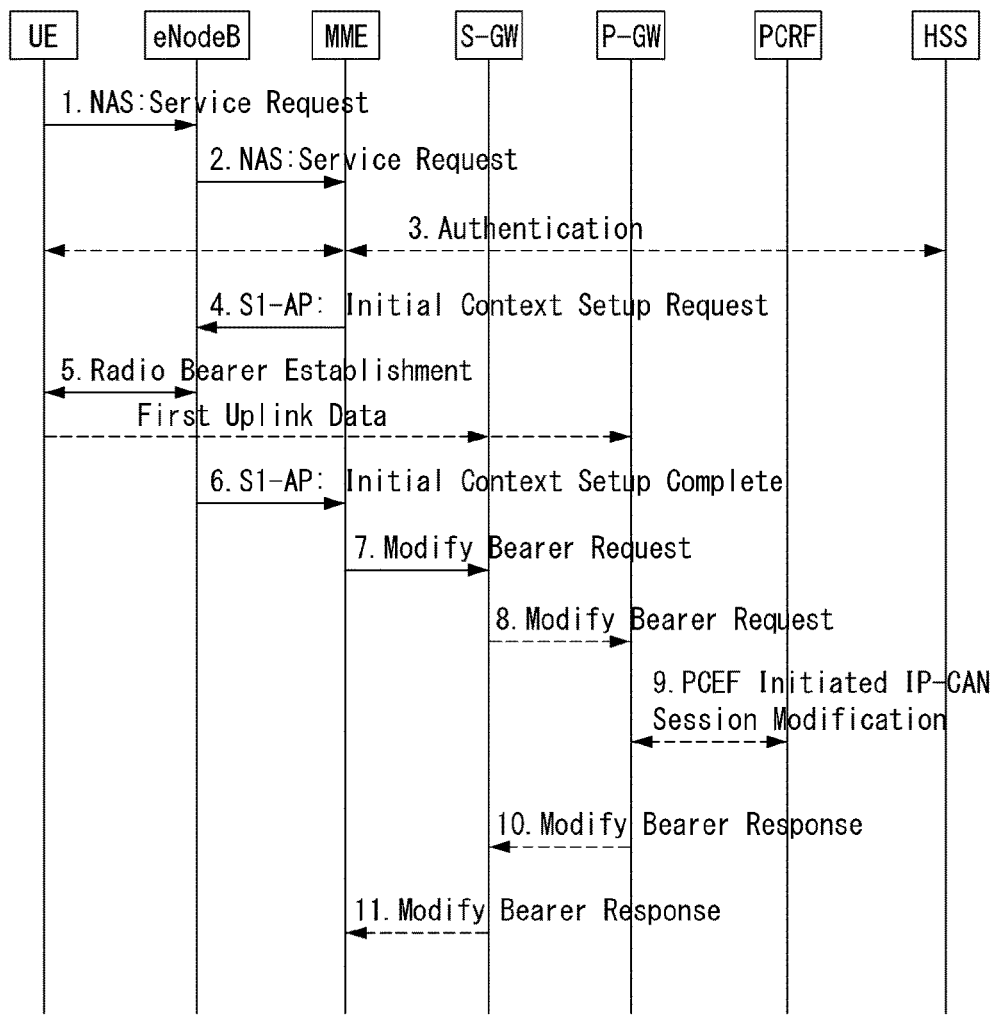

[FIG. 11]
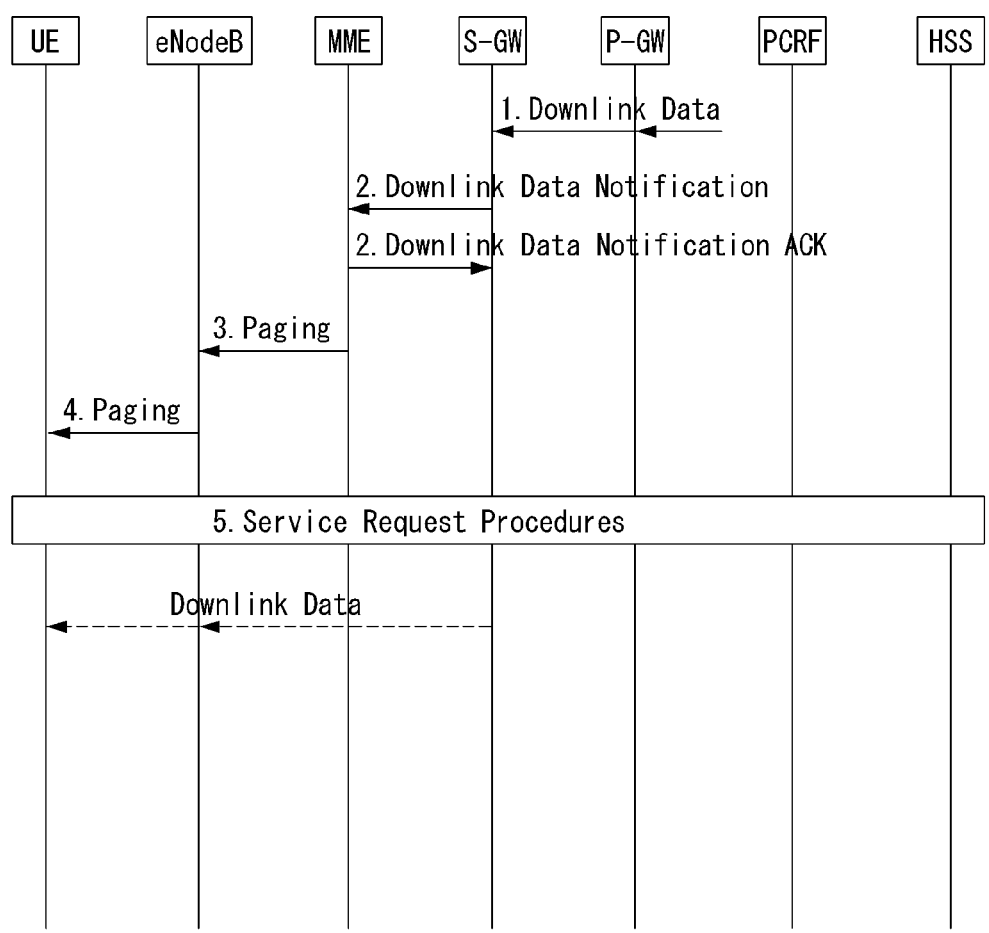

[FIG. 12]
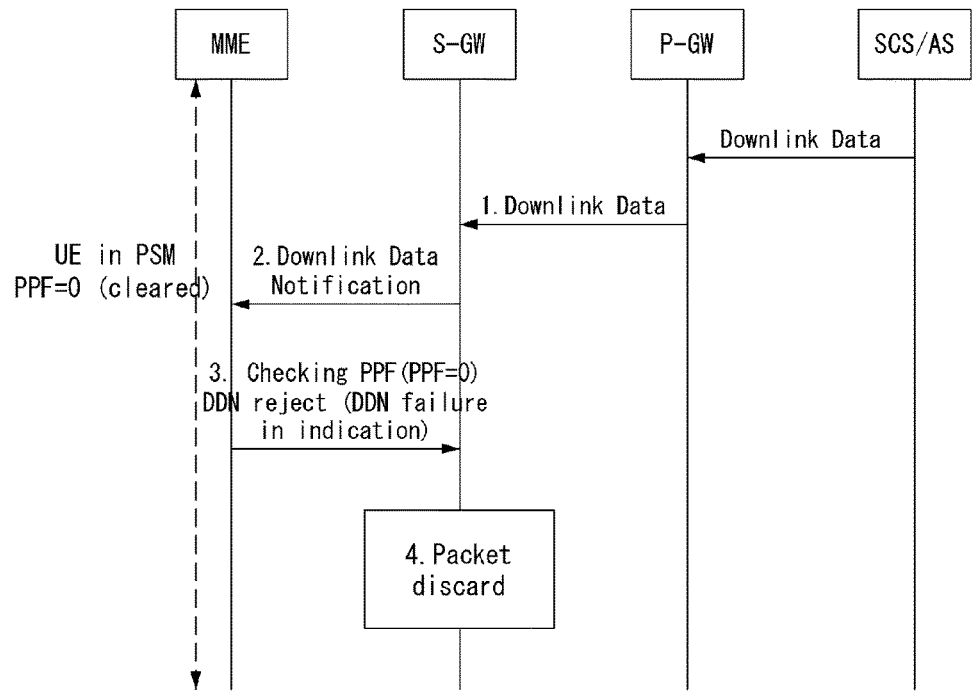
[FIG. 13]
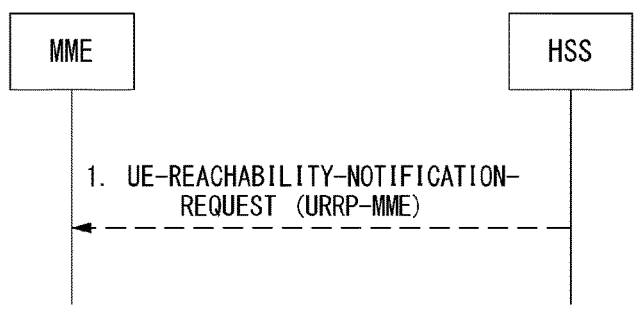

【FIG. 14】
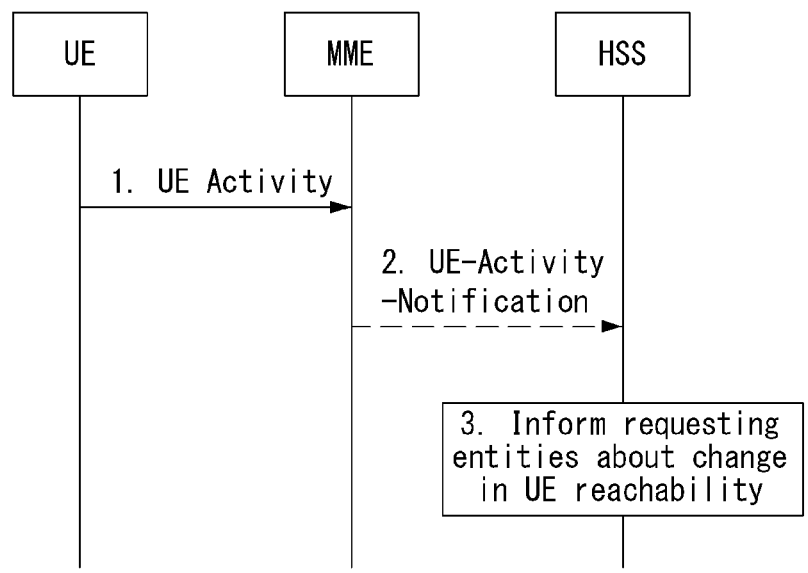

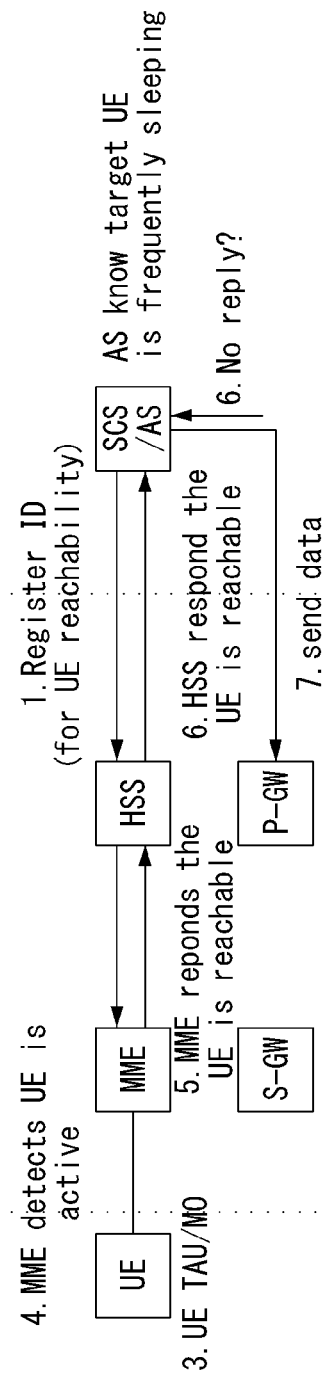
[FIG. 15]

[FIG. 16]
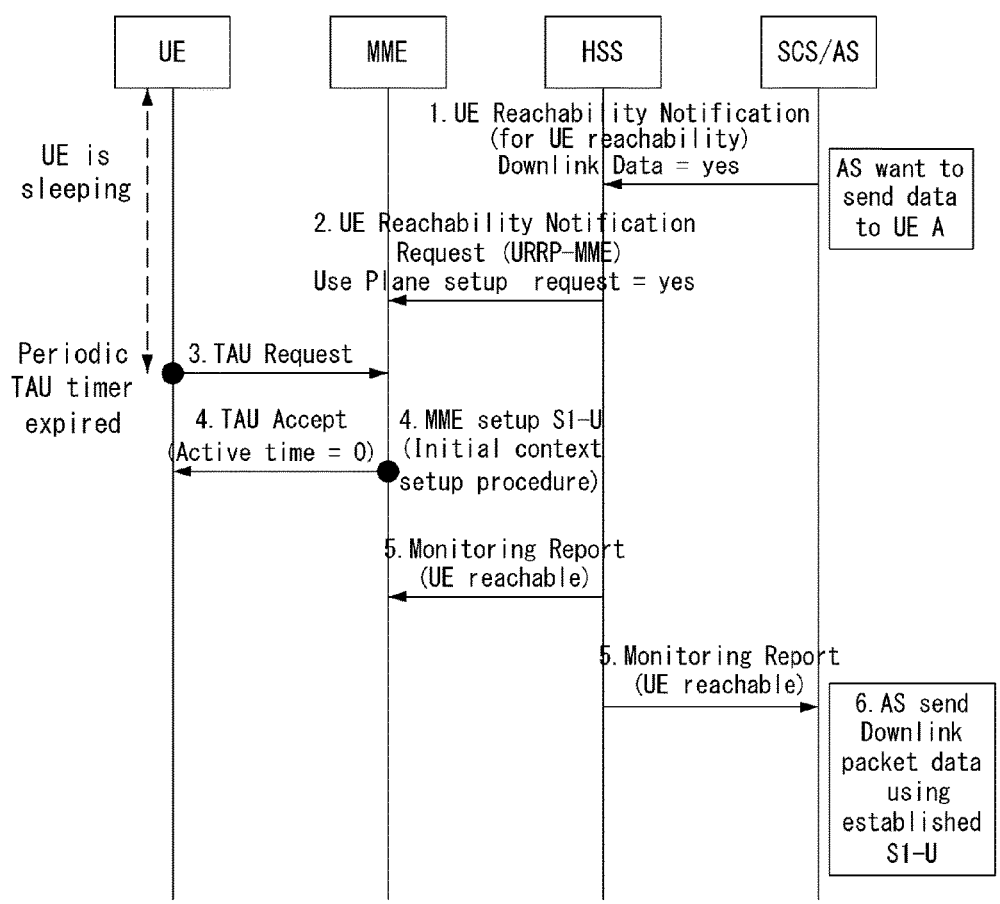

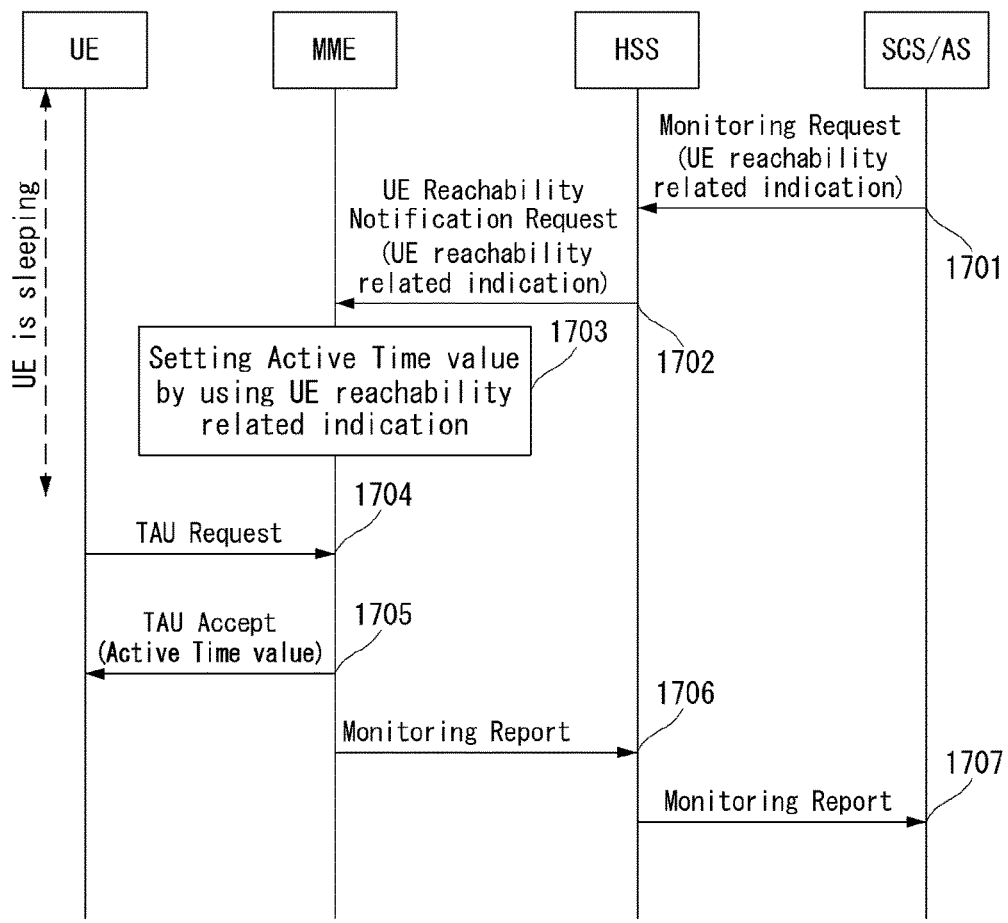

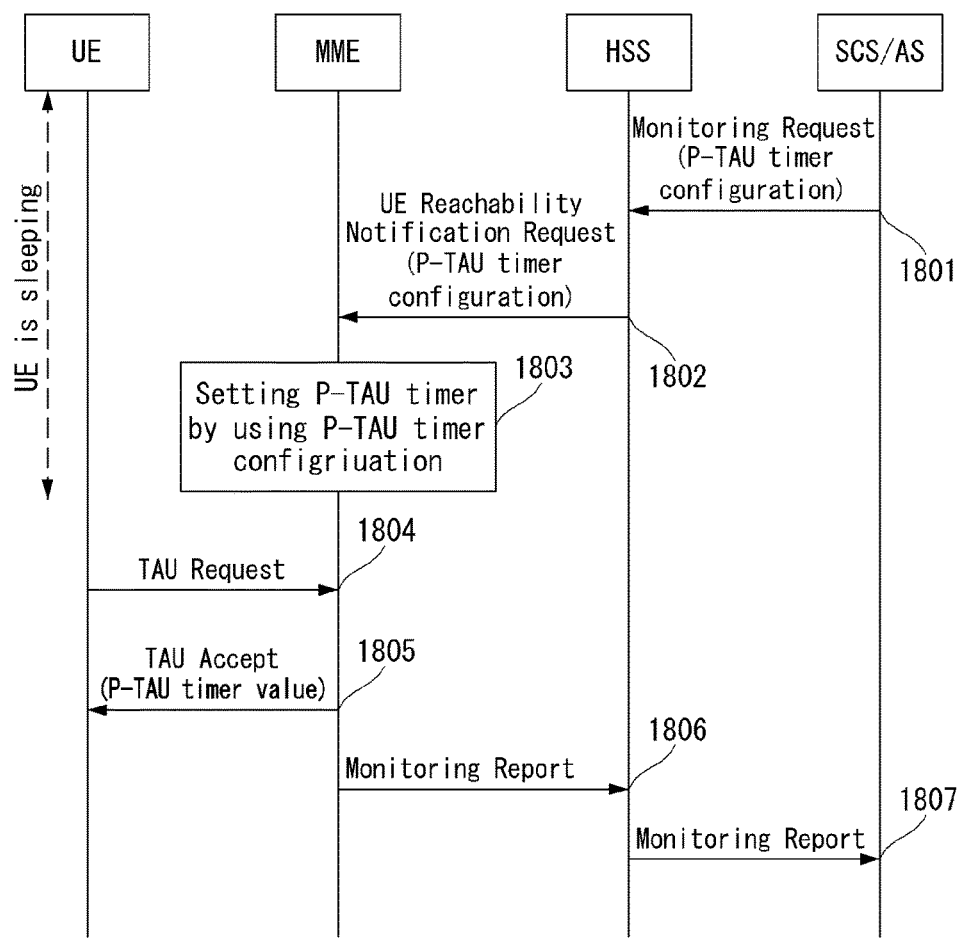
[FIG. 18]

[FIG. 19]
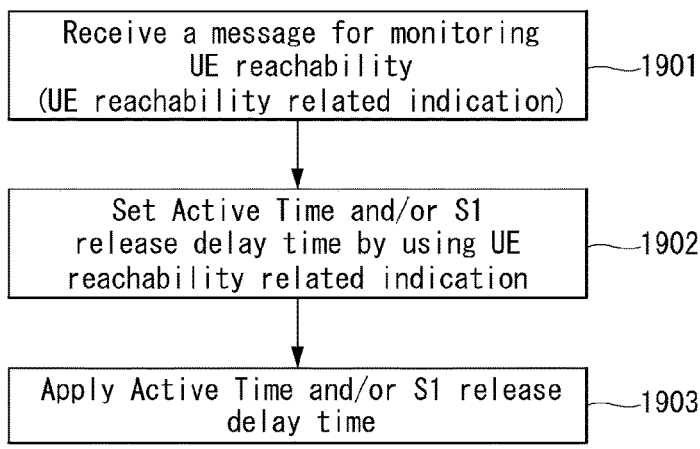
[FIG. 20]
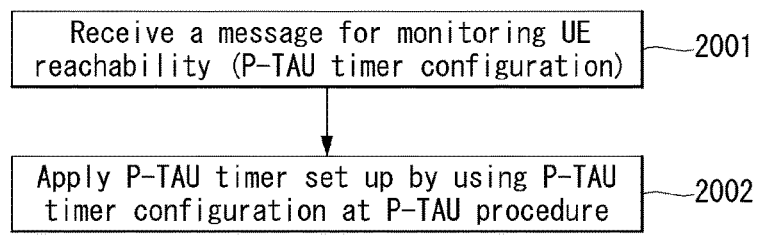
[FIG. 21]
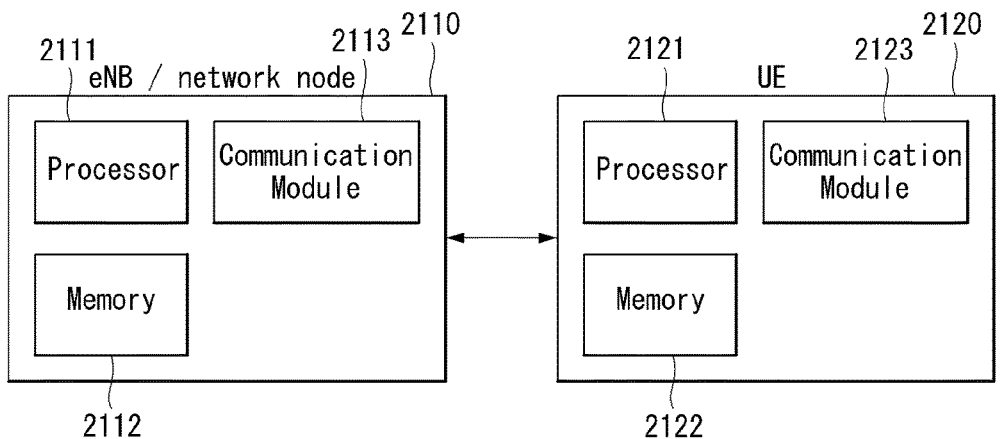

METHOD FOR MONITORING UE REACHABILITY IN WIRELESS COMMUNICATION SYSTEM, AND DEVICE FOR SAME

CROSS-REFERENCE TO RELATED APPLICATIONS

This application is the National Stage filing under 35 U.S.C. 371 of International Application No. PCT/KR2015/038393, filed on Aug. 11, 2015, which claims the benefit of U.S. Provisional Application No. 62/035,510, filed on Aug. 11, 2014, 62/061,158, filed on Oct. 8, 2014, 62/141,267, filed on Apr. 1, 2015, the contents of which are all hereby incorporated by reference herein in their entirety.

TECHNICAL FIELD

The present invention relates to wireless communication system and, more particularly, to a method for supporting or performing monitoring a user equipment (UE) reachability and an apparatus supporting the method.

BACKGROUND ART

Machine Type Communication (MTC) refers to a communication scheme including one or more machines and is also called Machine-to-Machine (M2M) communication. A machine in this context refers to an entity which does not require direction intervention of a human. For example, not only the device such as a meter equipped with a mobile communication module or a vending machine, but also a user equipment such as a smart phone capable of connecting automatically to a network and performing communication without a human intervention is an example of the machine. Various examples of the machine are called MTC devices or terminals in this document. In other words, MTC refers to the communication performed by one or more machines (namely, MTC devices) without incorporating human operation/intervention.

MTC includes communication between MTC devices (for example, Device-to-Device (D2D) communication) and communication between an MTC device and an MTC Application Server. Examples of communication between an MTC device and an MTC application include communication between a vending machine and a server; communication between a Point Of Sale (POS) device and a server; and communication between an electricity, gas, or water meter and a server. Besides, applications based on MTC include security, transportation, and health care.

DISCLOSURE

Technical Problem

The present invention has been made in an attempt to provide a method for transmitting downlink data (or packets) efficiently to constrained devices characterized by low complexity and low energy (for example, Internet of Things (IoT) devices, M2M devices, and category 0 terminals employing a single antenna to realize low complexity).

Technical objects of the present invention are not limited to those objects described above; other technical objects not mentioned above can be clearly understood from what are described below by those skilled in the art to which the present invention belongs.

Technical Solution

A method for monitoring User Equipment (UE) reachability in a wireless communication system according to one aspect of the present invention comprises receiving, by a Mobile Management Entity (MME), a message for monitoring UE reachability including UE reachability related indication from a Home Subscriber Server (HSS) and allocating, by the MME, an Active Time to a UE, wherein the UE reachability related indication can be used for setting the Active Time of the UE, and wherein the UE reachability indication can be used for the UE to stay reachable so that downlink data that a server wants to transmit to the UE can be transmitted to the UE.

Preferably, the UE reachability related indication can indicate that the server holds downlink data that the server wants to transmit to the UE.

Preferably, the UE reachability related indication can be transmitted from a Service Capability Server or an Application Server which holds downlink data to be transmitted to the UE.

Preferably, the Active Time can be set to '0'.

Preferably, the MME can transmit an Initial Context Setup Request message to an evolved-Node B (eNB) to establish an S1 bearer.

Preferably, the set Active Time can be transmitted through a Tracking Area Update Accept message, Attach Accept message, or Service Request Accept message.

A method for monitoring UE reachability in a wireless communication system according to one aspect of the present invention comprises transmitting a Monitoring Request message for requesting for monitoring the UE reachability if a server wants to transmit downlink data to a UE, wherein the Monitoring Request message can include UE reachability related indication and wherein the UE reachability related indication can be used for setting an Active Time of the UE.

Preferably, the UE reachability related indication can be used for the UE to stay reachable so that the server can deliver the downlink data to the UE.

Preferably, if the server receives notification that the UE is reachable, the server can transmit the downlink data to the UE.

A method for monitoring UE reachability in a wireless communication system according to another aspect of the present invention comprises receiving, by a Mobile Management Entity (MME), a message for monitoring UE reachability including Periodic Tracking Area Update (P-TAU) timer configruation from a Home Subscriber Server (HSS) and applying, by the MME, the P-TAU timer at a P-TAU procedure, wherein the P-TAU timer configuration can be used for setting the P-TAU timer.

Preferably, the P-TAU timer configuration can be transmitted from a Service Capability Server or an Application Server which holds downlink data to be transmitted to the UE.

Preferably, the set P-TAU timer can be transmitted through a Tracking Area Update Accept message, Attach Accept message, or Service Request Accept message.

Advantageous Effects

According to an embodiment of the present invention, downlink data can be transmitted in an efficient manner to UEs, particularly, to constrained devices with features of low complexity and low energy.

Also, according to an embodiment of the present invention, downlink data can be transmitted in an efficient manner to UEs supporting a relatively long sleep state (for example, power saving mode or sleep state of extended Discontinuous Reception) by monitoring and setting up reachability of the UEs.

The advantageous effect that can be obtained from the present invention are not limited to those described above, and other effects not mentioned above can be understood clearly by those skilled in the art to which the present invention belongs from the following descriptions.

DESCRIPTION OF DRAWINGS

The accompanying drawings, which are included to provide a further understanding of the invention as a part of detailed descriptions, illustrate embodiment(s) of the invention and together with the descriptions, serve to explain the technical principles of the invention.

FIG. 1 illustrates an Evolved Packet System (EPS) to which the present invention can be applied.

FIG. 2 illustrates one example of an Evolved Universal Terrestrial Radio Access Network (E-UTRAN) to which the present invention can be applied.

FIG. 3 illustrates a radio interface protocol structure between a UE and an E-UTRAN in a wireless communication system to which the present invention can be applied.

FIG. 4 illustrates an S1 interface protocol structure in a wireless communication system to which the present invention can be applied.

FIG. 5 illustrates an EMM and ECM states in a wireless communication system to which the present invention can be applied.

FIG. 6 illustrates a bearer structure in a wireless communication system to which the present invention can be applied.

FIG. 7 illustrates transmission paths of a control plane and a user plane in an EMM registration state in a wireless communication system to which the present invention can be applied.

FIG. 8 illustrates an Attach procedure in a wireless communication system to which the present invention can be applied.

FIG. 9 illustrates a periodic Tracking Area Update procedure in a wireless communication system to which the present invention can be applied.

FIG. 10 illustrates a UE trigger Service Request procedure in a wireless communication system to which the present invention can be applied.

FIG. 11 illustrates a Network trigger Service Request procedure in a wireless communication system to which the present invention can be applied.

FIG. 12 illustrates a Downlink Data Notification procedure with respect to a UE in a power saving mode in a wireless communication system to which the present invention can be applied.

FIG. 13 illustrates a UE Reachability Notification Request procedure in a wireless communication system to which the present invention can be applied.

FIG. 14 illustrates a UE Activity Notification procedure in a wireless communication system to which the present invention can be applied.

FIG. 15 illustrates a problem encountered at the time of transmitting downlink data by using a UE reachability notification procedure during a sleep period of a UE.

FIG. 16 illustrates a method for monitoring UE reachability according to one embodiment of the present invention.

FIG. 17 illustrates a method for monitoring UE reachability according to one embodiment of the present invention.

FIG. 18 illustrates a method for monitoring UE reachability according to one embodiment of the present invention.

FIG. 19 illustrates a method for monitoring UE reachability according to one embodiment of the present invention.

FIG. 20 illustrates a method for monitoring UE reachability according to one embodiment of the present invention.

FIG. 21 illustrates a block diagram of a communication device according to one embodiment of the present invention.

MODE FOR INVENTION

In what follows, preferred embodiments according to the present invention will be described in detail with reference to appended drawings. The detailed descriptions provided below together with appended drawings are intended only to explain illustrative embodiments of the present invention, which should not be regarded as the sole embodiments of the present invention. The detailed descriptions below include specific information to provide complete understanding of the present invention. However, those skilled in the art will be able to comprehend that the present invention can be embodied without the specific information.

For some cases, to avoid obscuring the technical principles of the present invention, structures and devices well-known to the public can be omitted or can be illustrated in the form of block diagrams utilizing fundamental functions of the structures and the devices.

A base station in this document is regarded as a terminal node of a network, which performs communication directly with a UE. In this document, particular operations regarded to be performed by the base station may be performed by a upper node of the base station depending on situations. In other words, it is apparent that in a network consisting of a plurality of network nodes including a base station, various operations performed for communication with a UE can be performed by the base station or by network nodes other than the base station. The term Base Station (BS) can be replaced with a fixed station, Node B, evolved-NodeB (eNB), Base Transceiver System (BTS), or Access Point (AP). Also, a terminal can be fixed or mobile; and the term can be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter can be part of the base station, and a receiver can be part of the terminal. Similarly, in uplink transmission, a transmitter can be part of the terminal, and a receiver can be part of the base station.

Specific terms used in the following descriptions are introduced to help understanding the present invention, and the specific terms can be used in different ways as long as it does not leave the technical scope of the present invention.

The technology described below can be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA can be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA can be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

Embodiments of the present invention can be supported by standard documents disclosed in at least one of wireless access systems including the IEEE 802, 3GPP, and 3GPP2 specifications. In other words, among the embodiments of the present invention, those steps or parts omitted for the purpose of clearly describing technical principles of the present invention can be supported by the documents above. Also, all of the terms disclosed in this document can be explained with reference to the standard documents.

To clarify the descriptions, this document is based on the 3GPP LTE/LTE-A, but the technical features of the present invention are not limited to the current descriptions.

Terms used in this document are defined as follows.

Universal Mobile Telecommunication System (UMTS): the 3rd generation mobile communication technology based on GSM, developed by the 3GPP Evolved Packet System (EPS): a network system comprising an Evolved Packet Core (EPC), a packet switched core network based on the Internet Protocol (IP) and an access network such as the LTE and UTRAN. The EPS is a network evolved from the UMTS.

NodeB: the base station of the UMTS network. NodeB is installed outside and provides coverage of a macro cell.

eNodeB: the base station of the EPS network. eNodeB is installed outside and provides coverage of a macro cell.

User Equipment (UE): A UE can be called a terminal, Mobile Equipment (ME), or Mobile Station (MS). A UE can be a portable device such as a notebook computer, mobile phone, Personal Digital Assistant (PDA), smart phone, or a multimedia device; or a fixed device such as a Personal Computer (PC) or vehicle-mounted device. The term UE may refer to an MTC terminal in the description related to MTC.

IP Multimedia Subsystem (IMS): a sub-system providing multimedia services based on the IP International Mobile Subscriber Identity (IMSI): a globally unique subscriber identifier assigned in a mobile communication network Machine Type Communication (MTC): communication performed by machines without human intervention. It may be called Machine-to-Machine (M2M) communication.

MTC terminal (MTC UE or MTC device): a terminal (for example, a vending machine, meter, and so on) equipped with a communication function operating through a mobile communication network and performing an MTC function MTC server: a server on a network managing MTC terminals. It can be installed inside or outside a mobile communication network. It can provide an interface through which an MTC user can access the server. Also, an MTC server can provide MTC-related services to other servers (in the form of Services Capability Server (SCS)) or the MTC server itself can be an MTC Application Server.

(MTC) application: services (to which MTC is applied) (for example, remote metering, traffic movement tracking, weather observation sensors, and so on)

(MTC) Application Server: a server on a network in which (MTC) applications are performed MTC feature: a function of a network to support MTC applications. For example, MTC monitoring is a feature intended to prepare for loss of a device in an MTC application such as remote metering, and low mobility is a feature intended for an MTC application with respect to an MTC terminal such as a vending machine.

MTC subscriber: an entity having a connection relationship with a network operator and providing services to one or more MTC terminals.

MTC group: an MTC group shares at least one or more MTC features and denotes a group of MTC terminals belonging to MTC subscribers.

Services Capability Server (SCS): an entity being connected to the 3GPP network and used for communicating with an MTC InterWorking Function (MTC-IWF) on a Home PLMN (HPLMN) and an MTC terminal.

External identifier: a globally unique identifier used by an external entity (for example, an SCS or an Application Server) of the 3GPP network to indicate (or identify) an MTC terminal (or a subscriber to which the MTC terminal belongs). An external identifier comprises a domain identifier and a local identifier as described below.

Domain identifier: an identifier used for identifying a domain in the control region of a mobile communication network service provider. A service provider can use a separate domain identifier for each service to provide an access to a different service.

Local identifier: an identifier used for deriving or obtaining an International Mobile Subscriber Identity (IMSI). A local identifier should be unique within an application domain and is managed by a mobile communication network service provider.

Radio Access Network (RAN): a unit including a Node B, a Radio Network Controller (RNC) controlling the Node B, and an eNodeB in the 3GPP network. The RAN is defined at the terminal level and provides a connection to a core network.

Home Location Register (HLR)/Home Subscriber Server (HSS): a database provisioning subscriber information within the 3GPP network. An HSS can perform functions of configuration storage, identity management, user state storage, and so on.

RAN Application Part (RANAP): an interface between the RAN and a node in charge of controlling a core network (in other words, a Mobility Management Entity (MME)/Serving GPRS (General Packet Radio Service) Supporting Node (SGSN)/Mobile Switching Center (MSC)).

Public Land Mobile Network (PLMN): a network formed to provide mobile communication services to individuals. The PLMN can be formed separately for each operator.

Non-Access Stratum (NAS): a functional layer for exchanging signals and traffic messages between a terminal and a core network at the UMTS and EPS protocol stack. The NAS is used primarily for supporting mobility of a terminal and a session management procedure for establishing and maintaining an IP connection between the terminal and a PDN GW.

In what follows, the present invention will be described based on the terms defined above.

Overview of System to which the Present Invention may be Applied

FIG. 1 illustrates an Evolved Packet System (EPS) to which the present invention can be applied.

The network structure of FIG. 1 is a simplified diagram restructured from an Evolved Packet System (EPS) including Evolved Packet Core (EPC).

The EPC is a main component of the System Architecture Evolution (SAE) intended for improving performance of the 3GPP technologies. SAE is a research project for determining a network structure supporting mobility between multiple heterogeneous networks. For example, SAE is intended to provide an optimized packet-based system which supports various IP-based wireless access technologies, provides much more improved data transmission capability, and so on.

More specifically, the EPC is the core network of an IP-based mobile communication system for the 3GPP LTE system and capable of supporting packet-based real-time and non-real time services. In the existing mobile communication systems (namely, in the 2nd or 3rd mobile communication system), functions of the core network have been implemented through two separate sub-domains: a Circuit-Switched (CS) sub-domain for voice and a Packet-Switched (PS) sub-domain for data. However, in the 3GPP LTE system, an evolution from the 3rd mobile communication system, the CS and PS sub-domains have been unified into a single IP domain. In other words, in the 3GPP LTE system, connection between UEs having IP capabilities can be established through an IP-based base station (for example, eNodeB), EPC, and application domain (for example, IMS). In other words, the EPC provides the architecture essential for implementing end-to-end IP services.

The EPC comprises various components, where FIG. 1 illustrates part of the EPC components, including a Serving Gateway (SGW), Packet Data Network Gateway (PDN GW), Mobility Management Entity (MME), Serving GPRS Supporting Node (SGSN), and enhanced Packet Data Gateway (ePDG).

The SGW operates as a boundary point between the Radio Access Network (RAN) and the core network and maintains a data path between the eNodeB and the PDN GW. Also, in case the UE moves across serving areas by the eNodeB, the SGW acts as an anchor point for local mobility. In other words, packets can be routed through the SGW to ensure mobility within the E-UTRAN (Evolved-UMTS (Universal Mobile Telecommunications System) Terrestrial Radio Access Network defined for the subsequent versions of the 3GPP release 8). Also, the SGW may act as an anchor point for mobility between the E-UTRAN and other 3GPP networks (the RAN defined before the 3GPP release 8, for example, UTRAN or GERAN (GSM (Global System for Mobile Communication)/EDGE (Enhanced Data rates for Global Evolution) Radio Access Network).

The PDN GW corresponds to a termination point of a data interface to a packet data network. The PDN GW can support policy enforcement features, packet filtering, charging support, and so on. Also, the PDN GW can act as an anchor point for mobility management between the 3GPP network and non-3GPP networks (for example, an unreliable network such as the Interworking Wireless Local Area Network (I-WLAN) or reliable networks such as the Code Division Multiple Access (CDMA) network and Wimax).

In the example of a network structure as shown in FIG. 1, the SGW and the PDN GW are treated as separate gateways; however, the two gateways can be implemented according to single gateway configuration option.

The MME performs signaling for the UE's access to the network, supporting allocation, tracking, paging, roaming, handover of network resources, and so on; and control functions. The MME controls control plane functions related to subscribers and session management. The MME manages a plurality of eNodeBs and performs signaling of the conventional gateway's selection for handover to other 2G/3G networks. Also, the MME performs such functions as security procedures, terminal-to-network session handling, idle terminal location management, and so on.

The SGSN deals with all kinds of packet data including the packet data for mobility management and authentication of the user with respect to other 3GPP networks (for example, the GPRS network).

The ePDG acts as a security node with respect to an unreliable, non-3GPP network (for example, I-WLAN, WiFi hotspot, and so on).

As described with respect to FIG. 1, a UE with the IP capability can access the IP service network (for example, the IMS) that a service provider (namely, an operator) provides, via various components within the EPC based not only on the 3GPP access but also on the non-3GPP access.

Also, FIG. 1 illustrates various reference points (for example, S1-U, S1-MME, and so on). The 3GPP system defines a reference point as a conceptual link which connects two functions defined in disparate functional entities of the E-UTAN and the EPC. Table 1 below summarizes reference points shown in FIG. 1. In addition to the examples of FIG. 1, various other reference points can be defined according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS core and the 3GPP anchor function of Serving GW. In addition, if direct tunnel is not established, it provides the user plane tunneling. |
| S5 | It provides user plane tunneling and tunnel management between Serving GW and PDN GW. It is used for Serving GW relocation due to UE mobility if the Serving GW needs to connect to a non-collocated PDN GW for the required PDN connectivity. |
| S11 | Reference point for the control plane protocol |

TABLE 1-continued

| Reference point | Description |
|---|---|
| | between MME and SGW |
| SGi | It is the reference point between the PDN GW and the packet data network. Packet data network may be an operator external public or private packet data network or an intra-operator packet data network (e.g., for provision of IMS services). This reference point corresponds to Gi for 3GPP accesses. |

Among the reference points shown in FIG. 1, S2a and S2b corresponds to non-3GPP interfaces. S2a is a reference point which provides reliable, non-3GPP access, related control between PDN GWs, and mobility resources to the user plane. S2b is a reference point which provides related control and mobility resources to the user plane between ePDG and PDN GW.

FIG. 2 illustrates one example of an Evolved Universal Terrestrial Radio Access Network (E-UTRAN) to which the present invention can be applied.

The E-UTRAN system is an evolved system from the existing UTRAN system; for example, it includes the 3GPP LTE/LTE-A system. The E-UTRAN consists of eNBs providing control plane and user plane protocol to the UE, and the eNBs are connected to each other by means of X2 interface. The X2 user plane interface (X2-U) is defined among the eNBs. The X2-U interface provides non-guaranteed delivery of the user plane Packet Data Unit (PDU). The X2 control plane interface (X2-CP) is defined between two neighboring eNBs. The X2-CP performs the functions of context delivery between eNBs, control of user plane tunnel between a source eNB and a target eNB, delivery of handover-related messages, uplink load management, and so on. The eNB is connected to the UE through a radio interface and is connected to the Evolved Packet Core (EPC) through the S1 interface. The S1 user plane interface (S1-U) is defined between the eNB and the Serving Gateway (S-GW). The S1 control plane interface (S1-MME) is defined between the eNB and the Mobility Management Entity (MME). The S1 interface performs the functions of EPS bearer service management, NAS signaling transport, network sharing, MME load balancing management, and so on. The S1 interface supports many-to-many-relation between the eNB and the MME/S-GW.

FIG. 3 illustrates a radio interface protocol structure between a UE and an E-UTRAN in a wireless communication system to which the present invention can be applied.

FIG. 3(a) illustrates a radio protocol structure for the control plane, and FIG. 3(b) illustrates a radio protocol structure for the user plane.

With reference to FIG. 3, layers of the radio interface protocol between the UE and the E-UTRAN can be divided into a first layer (L1), a second layer (L2), and a third layer (L3) based on the lower three layers of the Open System Interconnection (OSI) model, widely known in the technical field of communication systems. The radio interface protocol between the UE and the E-UTRAN consists of the physical layer, data link layer, and network layer in the horizontal direction, while in the vertical direction, the radio interface protocol consists of the user plane, which is a protocol stack for delivery of data information, and the control plane, which is a protocol stack for delivery of control signals.

The control plane acts as a path through which control messages used for the UE and the network to manage calls are transmitted. The user plane refers to the path through which the data generated in the application layer, for example, voice data, Internet packet data, and so on are transmitted. In what follows, described will be each layer of the control and the user plane of the radio protocol.

The physical layer (PHY), which is the first layer (L1), provides information transfer service to upper layers by using a physical channel. The physical layer is connected to the Medium Access Control (MAC) layer located at the upper level through a transport channel through which data are transmitted between the MAC layer and the physical layer. Transport channels are classified according to how and with which features data are transmitted through the radio interface. And data are transmitted through the physical channel between different physical layers and between the physical layer of a transmitter and the physical layer of a receiver. The physical layer is modulated according to the Orthogonal Frequency Division Multiplexing (OFDM) scheme and employs time and frequency as radio resources.

A few physical control channels are used in the physical layer. The Physical Downlink Control Channel (PDCCH) informs the UE of resource allocation of the Paging Channel (PCH) and the Downlink Shared Channel (DL-SCH); and Hybrid Automatic Repeat reQuest (HARQ) information related to the Uplink Shared Channel (UL-SCH). Also, the PDCCH can carry a UL grant used for informing the UE of resource allocation of uplink transmission. The Physical Control Format Indicator Channel (PCFICH) informs the UE of the number of OFDM symbols used by PDCCHs and is transmitted at each subframe. The Physical HARQ Indicator Channel (PHICH) carries a HARQ ACK (ACKnowledge)/NACK (Non-ACKnowledge) signal in response to uplink transmission. The Physical Uplink Control Channel (PUCCH) carries uplink control information such as HARQ ACK/NACK with respect to downlink transmission, scheduling request, Channel Quality Indicator (CQI), and so on. The Physical Uplink Shared Channel (PUSCH) carries the UL-SCH.

The MAC layer of the second layer (L2) provides a service to the Radio Link Control (RLC) layer, which is an upper layer thereof, through a logical channel. Also, the MAC layer provides a function of mapping between a logical channel and a transport channel; and multiplexing/demultiplexing a MAC Service Data Unit (SDU) belonging to the logical channel to the transport block, which is provided to a physical channel on the transport channel.

The RLC layer of the second layer (L2) supports reliable data transmission. The function of the RLC layer includes concatenation, segmentation, reassembly of the RLC SDU, and so on. To satisfy varying Quality of Service (QoS) requested by a Radio Bearer (RB), the RLC layer provides three operation modes: Transparent Mode (TM), Unacknowledged Mode (UM), and Acknowledge Mode (AM). The AM RLC provides error correction through Automatic Repeat reQuest (ARQ). Meanwhile, in case the MAC layer performs the RLC function, the RLC layer can be incorporated into the MAC layer as a functional block.

The Packet Data Convergence Protocol (PDCP) layer of the second layer (L2) performs the function of delivering, header compression, ciphering of user data in the user plane, and so on. Header compression refers to the function of reducing the size of the Internet Protocol (IP) packet header which is relatively large and contains unnecessary control to efficiently transmit IP packets such as the IPv4 (Internet Protocol version 4) or IPv6 (Internet Protocol version 6)

packets through a radio interface with narrow bandwidth. The function of the PDCP layer in the control plane includes delivering control plane data and ciphering/integrity protection.

The Radio Resource Control (RRC) layer in the lowest part of the third layer (L3) is defined only in the control plane. The RRC layer performs the role of controlling radio resources between the UE and the network. To this purpose, the UE and the network exchange RRC messages through the RRC layer. The RRC layer controls a logical channel, transport channel, and physical channel with respect to configuration, re-configuration, and release of radio bearers. A radio bearer refers to a logical path that the second layer (L2) provides for data transmission between the UE and the network. Configuring a radio bearer indicates that characteristics of a radio protocol layer and channel are defined to provide specific services; and each individual parameter and operating methods thereof are determined. Radio bearers can be divided into Signaling Radio Bearers (SRBs) and Data RBs (DRBs). An SRB is used as a path for transmitting an RRC message in the control plane, while a DRB is used as a path for transmitting user data in the user plane.

The Non-Access Stratum (NAS) layer in the upper of the RRC layer performs the function of session management, mobility management, and so on.

A cell constituting the base station is set to one of 1.25, 2.5, 5, 10, and 20 MHz bandwidth, providing downlink or uplink transmission services to a plurality of UEs. Different cells can be set to different bandwidths.

Downlink transport channels transmitting data from a network to a UE include a Broadcast Channel (BCH) transmitting system information, PCH transmitting paging messages, DL-SCH transmitting user traffic or control messages, and so on. Traffic or a control message of a downlink multi-cast or broadcast service can be transmitted through the DL-SCH or through a separate downlink Multicast Channel (MCH). Meanwhile, uplink transport channels transmitting data from a UE to a network include a Random Access Channel (RACH) transmitting the initial control message and a Uplink Shared Channel (UL-SCH) transmitting user traffic or control messages.

The logical channel is on top of the transport channel and is mapped to the transport channel. The logical channel can be divided into a control channel for delivery of control area information and a traffic channel for delivery of user area information. Examples of the logical channel are a Broadcast Control Channel (BCCH), Paging Control Channel (PCCH), Common Control Channel (CCCH), Dedicated Control Channel (DCCH), Multicast Control Channel (MCCH), Dedicated Traffic Channel (DTCH), and Multicast Traffic Channel (MTCH).

FIG. 4 illustrates an S1 interface protocol structure in a wireless communication system to which the present invention can be applied.

FIG. 4(a) illustrates the control plane protocol stack in the S1 interface, and FIG. 4(b) illustrates the user plane interface protocol structure in the S1 interface.

With reference to FIG. 4, the S1 control plane interface (S1-MME) is defined between the eNB and the MME. Similar to the user plane, the transport network layer is based on IP transmission. However, to ensure reliable transmission of message signaling, the transport network layer is added to the Stream Control Transmission Protocol (SCTP) layer which sits on top of the IP layer. The application layer signaling protocol is called S1 Application Protocol (S1-AP).

The SCTP layer provides guaranteed delivery of application layer messages.

The transport IP layer employs point-to-point transmission for Protocol Data Unit (PDU) signaling transmission.

For each S1-MME interface instance, single SCTP association uses a pair of stream identifiers for the S-MME common procedure. Only part of stream identifier pairs is used for the S1-MME dedicated procedure. The MME communication context identifier is allocated by the MME for the S1-MME dedicated procedure, and the eNB communication context identifier is allocated by the eNB for the S1-MME dedicated procedure. The MME communication context identifier and the eNB communication context identifier are used for identifying a UE-specific S1-MME signaling transmission bearer. The communication context identifier is delivered within each S1-AP message.

In case the S1 signaling transport layer notifies the S1AP layer of disconnection of signaling, the MME changes the state of the UE which has used the corresponding signaling connection to ECM-IDLE state. And the eNB releases RRC connection of the corresponding UE.

The S1 user plane interface (S1-U) is defined between eNB and S-GW. The S1-U interface provides non-guaranteed delivery of the user plane PDU between the eNB and the S-GW. The transport network layer is based on IP transmission, and the GPRS Tunneling Protocol User Plane (GTP-U) layer is used on top of the UDP/IP layer to deliver the user plane PDU between the eNB and the S-GW.

EMM and ECM State

In what follows, EPS Mobility Management (EMM) and EPS Connection Management (ECM) states will be described.

FIG. 5 illustrates an EMM and ECM states in a wireless communication system to which the present invention can be applied.

With reference to FIG. 5, to manage mobility of the UE in the NAS layer defined in the control planes of the UE and the MME, EMM-REGISTERED and EMM-DEREGISTERED states can be defined according to the UE is attached to or detached from a network. The EMM-REGISTERED and the EMM-DEREGISTERED states can be applied to the UE and the MME.

Initially, the UE stays in the EMM-DEREGISTERED state as when the UE is first powered on and performs registering to a network through an initial attach procedure to connect to the network. If the connection procedure is performed successfully, the UE and the MME makes transition to the EMM-REGISTERED state. Also, in case the UE is powered off or the UE fails to establish a radio link (namely, a packet error rate for a radio link exceeds a reference value), the UE is detached from the network and makes a transition to the EMM-DEREGISTERED state.

Similarly, to manage signaling connection between the UE and the network, ECM-CONNECTED and ECM-IDLE states can be defined. The ECM-CONNECTED and ECM-IDLE states can also be applied to the UE and the MME. ECM connection consists of RRC connection formed between the UE and the eNB; and S1 signaling connection formed between the eNB and the MME. In other words, establishing/releasing an ECM connection indicates that both of the RRC connection and S1 signaling connection have been established/released.

The RRC state indicates whether the RRC layer of the UE is logically connected to the RRC layer of the eNB. In other words, in case the RRC layer of the UE is connected to the RRC layer of the eNB, the UE stays in the RRC_CON- NECTED state. If the RRC layer of the UE is not connected to the RRC layer of the eNB, the UE stays in the RRC_IDLE state.

The network can identify the UE staying in the ECM-CONNECTED state at the level of cell unit and can control the UE in an effective manner.

On the other hand, the network is unable to know the existence of the UE staying in the ECM-IDLE state, and a Core Network (CN) manages the UE on the basis of a tracking area unit which is an area unit larger than the cell. While the UE stays in the ECM-IDLE state, the UE performs Discontinuous Reception (DRX) that the NAS has configured by using the ID allocated uniquely in the tracking area. In other words, the UE can receive a broadcast signal of system information and paging information by monitoring a paging signal at a specific paging occasion for each UE-specific paging DRX cycle.

When the UE is in the ECM-IDLE state, the network does not carry context information of the UE. Therefore, the UE staying in the ECM-IDLE state can perform a mobility-related procedure based on the UE such as cell selection or cell reselection without necessarily following an order of the network. In case the position of the UE differs from the position recognized by the network while the UE is in the ECM-IDLE state, the UE can inform the network of the corresponding position of the UE through a Tracking Area Update (TAU) procedure.

On the other hand, when the UE is in the ECM-CONNECTED state, mobility of the UE is managed by an order of the network. While the UE stays in the ECM-CONNECTED state, the network knows to which cell the UE currently belongs. Therefore, the network can transit and/or receiver data to or from the UE, control mobility of the UE such as handover, and perform cell measurement with respect to neighboring cells.

As described above, the UE has to make a transition to the ECM-CONNECTED state in order to receive a general mobile communication service such as a voice or data communication service. As when the UE is first powered on, the UE in its initial state stays in the ECM-IDLE state as in the EMM state, and if the UE successfully registers to the corresponding network through an initial attach procedure, the UE and the MEE make a transition to the ECM connection state. Also, in case the UE has already registered to the network but radio resources are not allocated as traffic is not activated, the UE stays in the ECM-IDLE state, and if new uplink or downlink traffic is generated for the corresponding UE, the UE and the MME make a transition to the ECM-CONNECTED state through a Service Request procedure.

FIG. 6 illustrates a bearer structure in a wireless communication system to which the present invention can be applied.

When the UE is connected to a Packet Data Network (PDN) (which is the peer entity of FIG. 6), PDN connection is established, which can be called an EPS session. The PDN provides a service function such as the Internet or IP Multimedia Subsystem (IMS) through an external or internal IP network of the service provider.

An EPS session comprises one or more EPS bearers. The EPS bearer refers to the transmission path of traffic generated between the UE and the PDN GW for the EPS to deliver user traffic. One or more EPS bearers can be set up for each UE.

Each EPS bearer can be classified into E-UTRAN Radio Access Bearer (E-RAB) or S5/S8 bearer, and the E-RAB can be further divided into a Radio Bearer (RB) and S1 bearer.

In other words, one EPS bearer corresponds to one RB, one S1 bearer, and one S5/S8 bearer.

The E-RAB delivers packets of the EPS bearer between the UE and the EPC. If an E-RAB is generated, the E-RAB bearer is one-to-one mapped to the EPS bearer. A Data Radio Bearer (DRB) delivers packets of the EPS bearer between the UE and the eNB. If a DRB is generated, it is one-to-one mapped to the EPS bearer/E-RAB. The S1 bearer delivers packets of the EPS bearer between the eNB and the S-GW. The S5/S8 bearer delivers EPS bearer packets between the S-GW and the P-GW.

The UE binds the EPS bearer in the uplink direction with a Service Data Flow (SDF). An SDF is a group of IP flow(s) obtained by classifying (or filtering) user traffic according to individual services. A plurality of SDFs can be multiplexed to the same EPS bearer by including a plurality of uplink packet filters. The UE stores mapping information between the uplink packet filter and the DRB to bind the SDF and the DRB with each other for uplink transmission.

The P-GW binds the SDF with the EPS bearer in the downlink direction. A plurality of SDFs can be multiplexed to the same EPS bearer by including a plurality of downlink packet filters. The P-GW stores mapping information between the downlink packet filter and the S5/S8 bearer to bind the SDF and the S5/S8 bearer with each other for downlink transmission.

The eNB stores one-to-one mapping information between the DRB and the S1 bearer to bind the DRB and the S1 bearer with each other. The S-GW stores one-to-one mapping information between the S1 bearer and the S5/S8 bearer to bind the S1 bearer and the S5/S8 bearer with each other for uplink/downlink transmission.

The EPS bearer can be one of two types: a default bearer and a dedicated bearer. The UE can have one default bearer and one or more dedicated bearers for each PDN. The minimum basic bearer that the EPS session can have with respect to one PDN is called default bearer.

The EPS bearer can be classified on the basis of its identity. The EPS bearer identity is allocated by the UE or the MME. The dedicated bearer(s) is combined with the default bearer by a Linked EPS Bearer Identity (LBI).

If the UE establishes an initial connection to the network through an initial attach procedure, an IP address is allocated to the UE to generate a PDN connection, and a default bearer is generated in the EPS interval. Unless the UE terminates the PDN connection, the default bearer is not released but maintained even when there is no traffic between the UE and the corresponding PDN; the default bearer is released when the corresponding PDN connection is terminated. At this time, not all the bearers acting as default bearers with respect to the UE across the whole interval are not activated; the S5 bearer connected directly to the PDN is maintained, and the E-RAB bearer related to radio resources (namely, DRB and S1 bearer) is released. And if new traffic is generated in the corresponding PDN, the E-RAB bearer is reconfigured to deliver traffic.

If the UE attempts to use a service of which the Quality of Service (QoS) (for example, Video on Demand (VoD) service) cannot be supported by the default bearer while using a service (for example, the Internet) through the default bearer, a dedicated bearer is created when the UE demands the high QoS service. In case there is no traffic from the UE, the dedicated bearer is released. The UE or the network can create a plurality of dedicated bearers depending on needs.

Depending on which service the UE uses, the IP flow can have different QoS characteristics. When the EPS session for the UE is established or modified, the network allocates network resources; or determines a control policy about QoS and applies the policy while the EPS session is maintained. The aforementioned operation is called Policy and Charging Control (PCC). A PCC rule is determined based on the operation policy (for example, a QoS policy, gate status, and charging method).

The PCC rule is determined in SDF unit. In other words, according to the service that the UE uses, the IP flow can have different QoS characteristics, IP flows having the same QoS are mapped to the same SDF, and the SDF becomes the unit by which the PCC rule is applied.

Main entities which perform the PCC function include a Policy and Charging Rules Function (PCRF) and Policy and Charging Enforcement Function (PCEF).

The PCRF determines a PCC rule for each SDF when the EPS session is established or modified and provides the PCC rule to the P-GW (or PCEF). After determining a PCC rule for the corresponding SDF, the P-GW detects the SDF for each IP packet transmitted or received and applies the PCC rule relevant to the corresponding SDF. When the SDF is transmitted to the UE via the EPS, the SDF is mapped to the EPS bearer capable of providing appropriate QoS according to the QoS rule stored in the P-GW.

PCC rules can be classified by dynamic PCC rules and pre-defined PCC rules. A dynamic PCC rule is provided dynamically from the PCRF to the P-GW when the EPS session is established or modified. On the other hand, a pre-defined PCC rule is predefined in the P-GW and activated/deactivated by the PCRF.

The EPS bearer includes a QoS Class Identifier (QCI) and Allocation and Retention Priority (ARP) as basic QoS parameters.

A QCI is a scalar used as a reference for accessing node-specific parameters which control bearer level packet forwarding treatment, where the scalar value is pre-configured by a network operator. For example, the scalar can be pre-configured by one of integer values ranging from 1 to 9.

The main purpose of the ARP is to determine whether a request for an establishment or modification of a bearer can be accepted or refused when only limited amount of resources are available. Also, the ARP can be used for the eNB to determine which bearer(s) to drop under the situation of limited resources (for example, handover).

EPS bearers can be classified to Guaranteed Bit Rate (GBR)-type bearers and non-GBR type bearers depending on QCI resource type. A default bearer is always a non-GBR type bearer, but a dedicated bearer can be a GBR or non-GBR type bearer.

A GBR-type bearer has GBR and Maximum Bit Rate (MBR) as QoS parameters in addition to the QCI and the ARP. The MBR indicates that fixed resources are allocated (bandwidth is guaranteed) for each bearer. On the other hand, a non-GBR type bearer has an Aggregated MBR (AMBR) as a QoS parameter in addition to the QCI and ARP. The AMBR indicates that instead of allocating resources to individual bearers, maximum bandwidth is allocated, where other non-GBR type bearers can be used together.

As described above, if QoS of the EPS bearer is determined, QoS of each bearer is determined for each interface. Since the bearer of each interface provides QoS of the EPS bearer according to the interface, the EPS bearer, RB, and S1 bearer all have a one-to-one relationship among them.

If the UE attempts to use a service of which the QoS cannot be supported by the default bearer while using a service through the default bearer, a dedicated bearer is created.

FIG. 7 illustrates transmission paths of a control plane and a user plane in an EMM registration state in a wireless communication system to which the present invention can be applied.

FIG. 7(a) illustrates ECM-CONNECTED state, and FIG. 7(b) illustrates ECM-IDLE state.

If the UE successfully attaches to the network and enters the EMM-Registered state, the UE receives a service by using an EPS bearer. As described above, the EPS bearer is divided into the DRB, S1 bearer, and S5 bearer according to the respective intervals.

As shown in FIG. 7(a), in the ECM-CONNECTED state where user traffic is present, NAS signaling connection, namely, ECM connection (RRC connection and S1 signaling connection) is established. Also, S11 GTP-C (GPRS Tunneling Protocol Control Plane) connection is established between the MME and the SGW, and S5 GTP-C connection is established between the SGW and the PDN GW.

Also, in the ECM-CONNECTED state, all of the DRB, S1 bearer, and S5 bearer are set up (namely, radio or network resources are allocated).

As shown in FIG. 7(b), in the ECM-IDLE state where there is no user traffic, the ECM connection (namely, RRC connection and S1 signaling connection) is released. However, the S11 GTP-C connection between the MME and the SGW; and the S5 GTP-C connection between the SGW and the PDN GW are retained.

Also, in the ECM-IDLE state, the DRB and the S1 bearer are all released, but the S5 bearer is retained (namely, radio or network resources are allocated).

Method for Monitoring a Downlink Control Channel for a UE in Discontinuous Reception (DRX) Mode The 3GPP LTE/LTE-A system defines EPS Connection Management (ECM)-CONNECTED state and ECM-IDLE state to manage signaling connection between the UE and the network. The ECM-CONNECTED state and ECM-IDLE state can also be applied to the UE and the MME. ECM connection comprises RRC connection established between the UE and the eNB; and S1 signaling connection established between the eNB and the MME. RRC state shows whether the RRC layer of the UE is logically connected to the RRC layer of the eNB. In other words, in case the RRC layer of the UE and the RRC layer of the eNB are connected to each other, the UE stays in the RRC_CONNECTED state. On the other hand, if the RRC layer of the UE is not connected to the RRC layer of the eNB, the UE stays in the RRC_IDLE state.

At this time, the RRC_CONNECTED state refers to the state where the UE is connected to a particular cell and indicates that the UE can receive a service in the cell unit, where the UE is managed in units of cells.

RRC_IDLE state refers to the state where no connection is established between the UE and the eNB, but only the connection to a Mobility Management Entity (MME) is maintained; in the RRC_IDLE state, the UE is managed in the Tracking Area (TA) unit which is an area unit larger than a cell. In other words, the UE in the RRC_IDLE state wakes up intermittently and monitors the Paging Channel (PCH) to check whether there is a paging message being transmitted to the UE. In other words, the UE performs Discontinuous Reception (DRX) set up by the Non-Access Stratum (NAS) by using the ID allocated uniquely in the tracking area. The UE can receive a broadcast signal of the system information and paging information by monitoring a paging signal for a specific paging event at each UE-specific paging DRX cycle. The UE which does not receive any activated service through the aforementioned network state definitions eventually minimizes its power consumption, and thus the eNB can utilize resources in an efficient manner.

As described above, to receive general mobile communication services such as voice and data communication, the UE has to make a transition to the ECM-CONNECTED state. As in the case when the UE is first powered on, the initial UE stays in the ECM-IDLE state; if the UE successfully registers to the corresponding network through an initial attach procedure, the UE and the MME makes a transition to the ECM-CONNECTED state. Also, in case the UE has been registered to the network but radio resources are not allocated to the UE as traffic is not activated, the UE stays in the ECM-IDLE state; if uplink or downlink traffic is newly generated in the corresponding UE, the UE and the MME make a transition to the ECM-CONNECTED state through a Service Request procedure.

The 3GPP LTE/LTE-A system defines a dormant mode and an active mode even for the RRC_CONNECTED state to minimize power consumption of the UE.

According to the definition above, if the UE staying in the RRC_CONNECTED state does not transmit or receive data for a predetermined time period, cell connection is retained, but the UE is made to enter the dormant mode. The UE staying in the dormant mode has to occasionally wake up and monitor a physical control channel to receive data that may be transmitted to the UE.

As described above, a wireless communication system employs a Discontinuous Reception (DRX) scheme of the UE to minimize power consumption of the UE.

The DRX method defined in the 3GPP LTE/LTE-A system can be used both for the dormant mode and the RRC_IDLE mode, and the DRX methods used in the respective modes are as follows.

1) Dormant mode in the RRC_CONNECTED state
Short DRX: short DRX cycle (2 ms~640 ms)
Long DRX: long DRX cycle (10 ms~2560 ms)
2) RRC IDLE state
Paging DRX: paging DRX cycle (320 ms~2560 ms)

The UE can perform monitoring of the PDCCH based on its unique identifier, RNTI (for example, C-RNTI, SI-RNTI, P-RNTI, and so on).

Monitoring of the PDCCH can be controlled by the DRX operation, and the eNB transmits the parameters related to the DRX to the UE through the RRC message. In particular, the UE has to always receive the SI-RNTI, P-RNTI, and so on irrespective of the DRX operation composed by the RRC message. At this time, the other PDCCHs excluding the PDCCH scrambled with the C-RNTI are always received through the common search space of a main serving cell (for example, Pcell).

If the DRX parameters are set up while the UE is in the RRC_CONNECTED state, the UE performs discontinuous monitoring of the PDCCH based on the DRX operation. On the other hand, if the DRX parameters are not set up, the UE performs continuous monitoring of the PDCCH.

In other words, the UE searches the PDCCH by performing blind decoding in a UE-specific search space of the PDCCH region based on the DRX operation. If no CRC error is detected when the UE unmasks the CRC of the PDCCH by using the RNTI, the UE regards that the corresponding PDCCH delivers the UE's control information.

Discontinuous PDCCH monitoring indicates that the UE monitors the PDCCH only in specific subframes, while continuous PDCCH monitoring indicates that the UE monitors the PDCCH for all of the subframes. Meanwhile, in case PDCCH monitoring is required in the operation unrelated to the DRX such as the random access procedure, the UE monitors the PDCCH according to the requirements of the corresponding operation.

Also, the UE receiving a paging message as described above can perform DRX to reduce power consumption.

To this purpose, the network configures a plurality of paging occasions for each time period called a paging cycle, a specific UE receives paging messages only at the time of specific paging occasions, and the UE does not receive a paging channel except for the specific paging occasions. Also, one paging occasion corresponds to one TTI.

Attach Procedure

For most cases, the attach procedure is used when the UE enters an E-UTRAN cell to establish a connection to a network. Also, the attach procedure can also be used when the UE performs handover from a non-3GPP network to the E-UTRAN.

FIG. 8 illustrates an attach procedure in a wireless communication system to which the present invention can be applied.

1-2. The UE initiates the attach procedure by transmitting an Attach Request message to the MME. The Attach Request message includes the International Mobile Subscriber Identity of the UE.

The Attach Request message is delivered being included in the RRC connection setup complete message through the RRC connection and is delivered being included in the initial UE message through the S1 signaling connection.

3. For authentication of the UE, the MME requests and receives information for the authentication from the HSS; and performs mutual authentication with the UE.

4. The MME registers the position of the UE in the HSS and to create a default bearer for the UE, receives user subscription information (namely, subscribed QoS profile) from the HSS.

5-6. The MME requests creation of a default bearer by transmitting a Create Session Request message to the S-GW, and the S-GW delivers the Create Session Request message to the P-GW. The Create Session Request message includes a QoS profile and S5 S-GW Tunnel Endpoint Identifier (TEID) from the HSS.

7. The P-GW allocates an IP address to be used by the UE and performs an IP Connectivity Access Network (IP-CAN) session establishment/modification procedure with the PCRF.

8. The P-GW transmits a Create Session Response message to the S-GW in response to the Create Session Request message. The Create Session Response message includes a QoS profile and S5 P-GW TEID to be applied to the default bearer.

When this procedure is done, the creation of S5 bearer is completed between the S-GW and the P-GW, and the S-GW is then able to transmit uplink traffic to the P-GW or to receive downlink traffic from the P-GW.

9. The S-GW transmits a Create Session Response message including S1 S-GW TEID to the MME in response to the Create Session Request message.

10-11. The MME transmits an Attach Accept message including an IP address allocated by the P-GW, a Tracking Area Identity (TAI) list, and a TAU timer to the UE in response to an Attach Request message.

The Attach Accept message is delivered being included in the Initial Context Setup Request message through the S1 signaling connection. The Initial Context Setup Request message includes the S1 S-GW TEID.

When this procedure is done, the uplink S1 bearer is created between the eNB and the S-GW, and the eNB is then able to transmit uplink traffic to the S-GW.

The Attach Accept message is delivered being included in an RRC Connection Reconfiguration message through the RRC connection.

When this procedure is done, the creation of DRB is completed between the UE and the eNB, and the UE is then able to transmit uplink traffic to the eNB or to receive downlink traffic from the eNB.

12. The eNB transmits an Initial Context Setup Response message to the MME in response to an Initial Context Setup Request message. The Initial Context Setup Response message includes S1 eNB TEID.

13-14. The UE transmits an Attach Complete message to the MME in response to the Attach Accept message.

The Attach Complete message is delivered being included in a UL Information Transfer message through the RRC connection and is delivered being included in a UL NAS Transport message through the S1 signaling connection.

When this procedure is done, a creation of default EPS bearer is completed between the UE and the P-GW, and the UE is then able to transmit uplink data to the P-GW.

15. The MME delivers S1 eNB TEID received from the eNB to the S-GW through a Modify Bearer Request message.

When this procedure is done, a creation of downlink S1 bearer is completed between the eNB and the S-GW, and the eNB is then able to receive downlink traffic from the S-GW.

16-17. Depending on the needs, the bearer between the S-GW and the P-GW is updated.

18. The S-GW transmits a Modify Bearer Response message to the MME in response to the Modify Bearer Request message.

When this procedure is done, a creation of downlink default EPS bearer is completed between the UE and the P-GW, and the P-GW is then able to transmit downlink data to the UE.

Periodic TAU Procedure

The Tracking Area Update (TAU) procedure is performed when the UE staying in the ECM-IDLE state attempts registering a new position or the TAU timer expires.

FIG. 9 illustrates a periodic tracking area update procedure in a wireless communication system to which the present invention can be applied.

1-2. If the TAU timer of the UE in the ECM-IDLE state expires, the Periodic TAU (P-TAU) procedure for reporting a Tracking Area (TA) to the MME is triggered.

The UE initiates the P-TAU procedure by transmitting a TAU Request message to the MME.

The TAU Request message is delivered being included in an RRC connection setup complete message through the RRC connection and is delivered being included in the initial UE message through the S1 signaling connection.

3. The MME which receives the TAU Request message resets the TAU timer and transmits a Modify Bearer Request message including an E-UTRAN Cell Global Identifier (ECGI) and a TAI to the S-GW.

4-5. In case the cell (ECGI) or the tracking area (TAI) in which the UE is located changes, the S-GW transmits the Modify Bearer Request message to the P-GW.

The P-GW performs an EPS session update procedure and transmits a Modify Bearer Response message to the S-GW in response to the Modify Bearer Request message.

6. The S-GW transmits a Modify Bearer Response message to the MME in response to the Modify Bearer Request message.

7-8. The MME transmits a TAU Accept message to the UE in response to a TAU Request message.

The TAU Accept message can include the TAU timer.

The TAU Accept message is delivered being included in a downlink NAS transport message through the S1 signaling connection and delivered being included in a downlink information transfer message through the RRC connection.

9. The MME which has completed a position update of the UE releases connection to the UE used for transmission and reception of the periodic TAU-related message and transmits a UE context release command to the eNB to release the user context set up within the E-UTRAN.

10. The eNB deletes the context of the UE and releases resources allocated to the UE. And the eNB releases RRC connection to the UE by transmitting an RRC connection release message to the UE.

11. The eNB transmits a UE context release complete message to the MME in response to a UE context release command message, thereby releasing the S1 signaling connection between the eNB and the MME.

When the procedure above is completed, the UE again makes a transition to the ECM-IDLE state.

Service Request Procedure

For most cases, the UE-triggered Service Request procedure is used when the UE initiates a new service or attempts to transmit uplink data in response to a paging message.

FIG. 10 illustrates a UE trigger Service Request procedure in a wireless communication system to which the present invention can be applied.

1-2. The UE initiates a UE-triggered Service Request procedure by transmitting a Service Request message to the MME.

The Service Request message is delivered being included in an RRC connection setup complete message through the RRC connection and delivered being included in an initial UE message through the S1 signaling connection.

3. For authentication of the UE, the MME requests and receives information for the authentication from the HSS; and performs mutual authentication with the UE.

4. The MME transmits an Initial Context Setup Request message to the eNB so that the eNB can configure an S1 bearer with the S-GW and configure a DRB with the UE.

5. The eNB transmits an RRC Connection Reconfiguration message to the UE to create the DRB.

When this procedure is done, the creation of DRB is completed between the eNB and the UE, and all of uplink EPS bearers ranging from the UE to the P-GW are configured. The UE can transmit uplink traffic data to the P-GW.

6. The eNB transmits an Initial Context Setup Complete message including 'S1 eNB TEID' to the MME in response to the Initial Context Setup Request message.

7. The MME delivers the 'S1 eNB TEID' received from the eNB to the S-GW through a Modify Bearer Request message.

When this procedure is done, the creation of S1 bearer is completed between the eNB and the S-GW, and then all of the downlink EPS bearers ranging from the P-GW and the UE are configured. The UE can then receive downlink traffic data from the P-GW.

8. In case the cell (ECGI) or the tracking area (TAI) in which the UE is located changes, the S-GW transmits the Modify Bearer Request message to the P-GW.

9. If needed, the P-GW can perform an IP connectivity access network (IP-CAN) session modification procedure with the PCRF.

10. Receiving a Modify Bearer Request message from the S-GW, the P-GW transmits a Modify Bearer Response message to the S-GW in response to the message.

11. The S-GW transmits a Modify Bearer Response message to the MME in response to the Modify Bearer Request message.

A network-triggered Service Request procedure is usually performed when the network attempts to transmit downlink data to the UE staying in the ECM-IDLE state.

FIG. 11 illustrates a Network trigger Service Request procedure in a wireless communication system to which the present invention can be applied.

1. If downlink data arrives at the P-GW via an external network, the P-GW delivers downlink data to the S-GW.

2. In case the downlink S1 bearer is released and unable to transmit downlink data to the eNB (namely, in case 'S1 eNB TEID' value is not found in the S-GW), the S-GW buffers the received downlink data. And the S-GW transmits a Downlink Data Notification message to the MME to which the UE is registered for signaling connection and bearer configuration with respect to the corresponding UE.

The MME transmits a Downlink Data Notification ACK message to the S-GW in response to the Downlink Data Notification message.

3. The MME transmits a paging message to the eNB belonging to the tracking area to which the UE has most recently registered.

4. If the eNB receives a paging message from the MME, the eNB broadcasts the paging message.

5. The UE, noticing the existence of downlink data directed to itself, sets up an ECM connection by performing a Service Request procedure.

The Service Request procedure can be performed in the same way as the procedure of FIG. 10, and if the procedure is completed, the UE can receive downlink data from the S-GW.

Power Saving Mode

Power Saving Mode (PSM) is one of the 3GPP rel-12 MTCe (Enhancement for MTC) features, where the UE can minimize power consumption by defining an interval in which the UE deactivates all of the Access Stratum (AS) operations such as paging reception and mobility management. In other words, a UE supporting the PSM may compromise with the network on the Active Time and periodic TAU timer or receive the Active Time and periodic TAU timer from the network during attach and tracking area update.

If the UE receives the Active Time value from the network, when the UE transits from the ECM-CONNECTED to the ECM-IDLE state, the UE receives a paging message by staying in the ECM-IDLE state during the corresponding Active Time period. And if the Active Time period is expired, the UE enters the PSM and deactivates all Access Stratum (AS) operations.

Also, the MME initiates the Active timer by applying the Active Time value each time the UE enters the ECM-IDLE mode. And if the Active timer is expired, the MME deduces that the UE is unreachable.

In other words, Active Time refers to the time period during which the UE supporting the state employing a power saving function (for example, PSM) stays in the ECM-IDLE (or RRC_IDLE) state.

If the periodic TAU timer expires, the UE again enables the AS operation and performs the TAU, and the network stops the implicit detach timer of the corresponding UE. The UE can wake up anytime for a mobile originated call (for example, uplink data packet transfer).

On the other hand, the UE wakes up at each P-TAU period and performs TAU to deal with mobile terminated calls (for example, downlink data packet receiving); performs the paging receiving operation during the received Active Time; and again enters the PSM mode to sleep.

In case the UE enters the PSM, when downlink data to be transmitted to the corresponding UE are generated, the following process can be performed.

FIG. 12 illustrates a Downlink Data Notification procedure with respect to a UE in a power saving mode in a wireless communication system to which the present invention can be applied.

FIG. 12 assumes that the UE has entered the PSM. Recognizing that the UE has entered the PSM, the MME clears the Packet Proceed Flag (PPF) (namely, PPF=0).

1. If downlink data to be transmitted to the UE are generated, the Application Server (AS) (or SCS) transmits the downlink data to the P-GW, and the P-GW transmits received downlink data to the S-GW.

2. In case the S-GW receives the downlink data from the P-GW and finds that there is no active S1-U connection of the corresponding UE (namely, the S1 bearer is released), the S-GW transmits a Downlink Data Notification (DDN) message to the MME and buffers the received downlink data. The DDN message notifies the UE of existence of downlink data to be transmitted.

3. If receiving the DDN from the S-GW, the MME checks the PPF. As in the example of FIG. 12, in case the MME clears the PPF (namely, PPF=0), the MME transmits a DDN reject message indicating a DDN failure (or including indication of a DDN failure) in response to the DDN received from the S-GW. The DDN reject message can include a reject cause.

4. The S-GW having received the DDN reject message discards the corresponding downlink data.

As described above, in case the AS transmits downlink data while not knowing whether the UE is in the sleep mode (namely, whether the UE enters the PSM), the downlink data are eventually discarded in the S-GW, and the AS fails to receive a response of the transmission; thus, the AS attempts to perform the re-transmission operation with respect to the corresponding downlink data.

UE Reachability Procedure

The 3GPP system defines two procedures for service-related entities which need to receive a notification due to reachability of the UE in the EPC NAS level. One of them is a UE Reachability Notification Request procedure, and the other is a UE Activity Notification procedure. In what follows, the two procedures will be described.

FIG. 13 illustrates a UE Reachability Notification Request procedure in a wireless communication system to which the present invention can be applied.

The UE Reachability Notification Request procedure refers to the procedure employed by the Application Server (AS)/SCS to request a UE reachability notification from the HSS. In what follows, specific procedures will be described.

1. If a service-related entity requests the HSS to provide an indicator with respect to the UE reachability from the EPS, the HSS stores the service-related entity and sets up UE Reachability Request Parameter for MME (URRP-MME) to indicate reception of such a request.

At this time, the URRP-MME is one of data maintained within the HSS, which is the UE Reachability Request Parameter indicating that UE Activity Notification from the MME has requested by the HSS.

If the URRP-MME parameter value changes from "not set" to "set", the HSS transmits a UE-REACHABILITY-NOTIFICATION-REQUEST message to the MME and requests the MME to set the URRP-MME with respect to the corresponding UE. At this time, the UE-REACHABILITY-NOTIFICATION-REQUEST message includes the URRP-MME parameter.

If the MME has Mobility Management (MM) context with respect to the user and detects a change of UE reachability (for example, the next NAS operation of the UE is detected), the MME sets the URRP-MME parameter intended to indicate that it needs to report information related to the reachability change to the HSS.

At this time, the URRP-MME is one of MM context maintained within the MME, which is used to indicate that the HSS has requested the MME to notify the HSS regarding the UE reachability at MME.

FIG. 14 illustrates a UE Activity Notification procedure in a wireless communication system to which the present invention can be applied.

1. The MME receives notification related to UE reachability. For example, the MME may receive an Attach Request message (or Service Request message, or TAU Request message, etc) from the UE or receive notification from the S-GW that the UE has made a handover to non-3GPP coverage.

2. If the MME has MM context of the UE and is configured so that the URRP-MME with respect to the corresponding UE is reported when the UE is reachable, the MME transmits a UE-Activity-Notification message to the HSS and clears the URRP-MME with respect to the corresponding UE. At this time, the UE-Activity-Notification message includes an IMSI of the UE and UE-reachable indicator.

3. When the HSS receives a UE-Activity-Notification message (IMSI, UE-reachable indicator) or a update location message with respect to the UE to which the URRP-MME is set, the HSS notifies the entity which has registered (or requested) the UE reachability notification (namely, a service-related entity) of the change of the UE reachability and clears the URRP-MME with respect to the corresponding UE.

Method for Monitoring UE Reachability

The present invention provides a method for supporting downlink data transmission (or downlink packet or downlink packet data) to the UE in an efficient manner.

In particular, the present invention provides a method for transmitting downlink data efficiently to constrained devices characterized by low complexity and low energy (for example, Internet of Things (IoT) devices, M2M devices, and category 0 terminals employing a single antenna to realize low complexity) in case the constrained devices enter a sleeping mode for a long time to minimize power consumption.

In what follows, the unreachable state of the UE refers to the state where the UE uses the power saving function (for example, the PSM or extended idle mode DRX). In what follows, for the convenience of description, the unreachable state of the UE is collectively called a 'sleep' state.

The extended DRX (eDRX) is the function intended to minimize power consumption of the UE by extending the maximum existing paging DRX cycle of 2.56 sec to a few minutes to a maximum of tens of minutes. The eDRX can be applied to the idle mode and connected mode.

In other words, in the case of a UE supporting the PSM, the unreachable state of the UE may refer to the state where the UE has already entered the PSM. Also, in the case of a UE supporting the eDRX mode, the unreachable state of a UE may refer to the unreachable state of a UE by paging (namely, the DRX interval for which the UE does not monitor the paging channel).

On the other hand, the reachable state of a UE refers to the state where the UE stays in the ECM-CONNECTED mode or ECM-IDLE mode in which the UE applies a normal DRX period (for example, less than 2.56 sec). For example, in the case of a UE supporting the PSM, the reachable stated may refer to the state where the UE is stays in connected mode or in the Active Time period, since the UE retains idle mode during the Active Time period. For example, in the case of a UE supporting the eDRX mode, the reachable state may refer to the state where the UE is reachable immediately by the ECM-CONNECED mode and/or paging (namely, the interval for which the UE monitors the paging channel). In other words, eDRX has a DRX interval relatively longer than the normal DRX mode; thus, it may be determined that the UE is temporarily unreachable even in the idle interval. That is, in the case of the normal DRX mode (2.56 seconds), data delivery is possible after a maximum of 2.56 seconds; however, if eDRX (10 minutes) is applied, the maximum delay is 10 minutes and therefore, immediate data delivery is not possible, which can be regarded that the UE is actually unreachable.

In particular, the present invention allows asynchronous operation independently of the UE's Power Saving (PS) period while minimizing discarding packet data and re-transmission burden in case the Application Server (AS) wants to perform delay-tolerant data transmission.

When the existing procedure is utilized to transmit downlink data to a unreachable UE, the following problems can occur.

First, it is difficult to perform the synchronized mobile terminated call operation between the AS and a constrained device.

Although the AS may set up the S1-U by transmitting downlink data during Active time period in which paging reception is possible by deducing the sleep period of the UE or using a pre-configured value, it may not be possible to keep a synchronized operation due to the following causes.

In case the UEs belonging to the same group perform the attach and/or TAU procedure at the same time, individual UEs can be configured with arbitrary values to avoid congestion caused by the simultaneous operation and can access the network in a distributed manner. In this case, the reachable interval of the UE estimated by the AS may be different from the actual reachable interval of the UE.

Depending on a Mobile Originated (MO) operation of the UE, the reachable interval can be varied. In other words, though the MO operation of the UE can be performed periodically, in case the MO operation is performed according to a particular event, the corresponding period can be changed. In this case, too, the reachable interval of the UE deduced by the AS can be changed.

Also, in the case of an IoT device operating without battery replacement for a long time (for example, 10 years), the wake-up period can be changed depending on the battery capacity.

Next, another problem is that the AS may re-transmit downlink data or the S-GW may discard the downlink data.

In the case of an existing UE, the AS could transmit downlink data while the UE was staying in the ECM-IDLE state. In other words, in case the S-GW receives downlink data from the P-GW, no S1-U is configured with respect to the corresponding UE, and the S-GW gives a DDN to the MME, the MME transmits a paging signal to wake up the corresponding UE (see FIG. 11).

However, in case it is determined that the UE is unreachable (for example, the UE does not perform TAU even if the P-TAU of the corresponding UE is expired), the MME clears the PPF; in this case, the MME does not perform the paging procedure even if the MME receives a DDN, but makes the S-GW discard the corresponding downlink data through DDN rejection.

Also, since the MME clears the PPF of the UE in the PSM, the S-GW eventually discards the downlink data received during sleep intervals due to the UE's PSM (see FIG. 12). In this case, even if the AS attempts re-transmission after a predetermined time period, the transmitted downlink data will still be discarded when the corresponding UE is in the sleep mode.

Next, even if the AS transmits data after checking reachability of the UE by reusing the UE reachability notification procedure to prevent downlink data from being discarded while the UE is in the sleep mode, another problem will still be encountered, which will be described below with reference to related drawings.

FIG. 15 illustrates a problem encountered at the time of transmitting downlink data by using a UE reachability notification procedure during a sleep period of a UE.

1. The SCS/AS registers UE reachability notification to the HSS in case the SCS/AS has data to be transmited to the UE.

2. The HSS transmits a UE-REACHABILITY-NOTIFICATION-REQUEST message to the MME.

3-5. Recognizing the UE to be active through the TAU (or the attach procedure, Service Request procedure, or MO, etc), the MME transmits a UE-Activity-Notification message to the HSS.

6. The HSS, which has received the UE-Activity-Notification message from the MME, provides the SCS/AS with the notification that the UE is reachable.

7. Receiving the notification that the UE is reachable, the SCS/AS transmits downlink data to the corresponding UE. In other words, the SCS/AS transmits downlink data to the S-GW via P-GW.

At this time, the S-GW transmits a DDN to the MME if the S1-U has not been set up yet. In case only the S-MME of the corresponding UE has been set up, the MME configures the S1-U through an Initial Context Setup operation, and the S-GW transmits buffered downlink data to the UE.

In this case, if the S1-MME is released after the UE's TAU and the UE stays in the Active time period, the MME, through a paging procedure, can command the UE to proceed with a Service Request procedure.

However, if the UE has already entered to a sleep interval due to short Active time depending on situations (for example, PSM), successful data transmission may not be possible.

From the standpoint of the UE, performing the Service Request procedure through the paging procedure during the Active time period may cause inconvenience of switching states from the ECM-CONNECTED to the ECM-IDLE state and again to the ECM-CONNECTED state. If it is the case that the downlink data is transmitted before the S1-MME is released after the UE performs the TAU, an unnecessary operation may be generated, where the UE has to stay in the ECM-IDLE state during the Active time period after the downlink data are transmitted to receive a paging signal that can be received only with a low possibility.

The present invention provides a procedure of requesting setting up the S1-U for downlink data transmission together with the TAU in case the AS requests reachability report monitoring of the UE (in particular, constrained devices such as IoT, M2M, and category 0 devices).

FIG. 16 illustrates a method for monitoring UE reachability according to one embodiment of the present invention.

1. In case the Application Server (AS)/Service Capability Server (SCS) wants to transmit downlink data to the UE, the AS/SCS sets the 'Downlink Data' which indicates the existence of downlink data to 'yes' (namely, Downlink Data='yes') and transmits UE reachability notification (or a Monitoring Request message) including the indicator ('Downlink Data') set to 'yes' to the HSS.

In other words, by transmitting the UE reachability notification where the downlink data indicator ('Downlink Data') is set to 'yes' to the HSS, the AS/SCS not only registers the UE reachability notification to the HSS but also requests setting up the S1-U (namely, S1 bearer configuration) in case the S1-U configuration is not set up between the UE and the S-GW (namely, the S1 bearer has been released).

2. The HSS sets the 'User Plane Setup Request' which request setting up the S1-U to 'yes' (namely, 'User Plane Setup Request'='yes') and transmits the UE Reachability Notification Request message including the 'User Plane Setup Request' which has been set to 'yes' to the MME.

In other words, by transmitting the UE Reachability Notification Request message where the 'User Plane Setup Request' has been set to 'yes' to the MME, the HSS registers an S1-U setup request to the MME and at the same time, requests URRP-MME setup.

Also, the HSS may transmit the UE Reachability Notification Request message to the MME by incorporating the downlink data indicator ('Downlink Data') received from the AS/SCS rather than the 'User Plane Setup Request' into the UE Reachability Notification Request message.

Receiving the UE reachability notification from the AS/SCS, the HSS can store the AS/SCS which has transmitted the UE reachability notification and set up UE Reachability Request Parameter for MME (URRP-MME) to notify that such a request has been received.

If the MME, having received the UE reachability notification message from the HSS, detects a change of UE reachability (for example, the case where the NAS operation of the UE is detected), the MME sets up the URRP-MME to indicate the needs for reporting the information about the UE reachability change to the HSS and at the same time, registers the needs for S1-U setup.

3. Meanwhile, if the P-TAU timer of the UE in the sleep mode (in the PSM or in a state where the UE is unreachable through paging in the eDRX mode) is expired, the UE transmits the TAU Request message to the MME.

At this time, the MME detects UE reachability by receiving the TAU Request message of the UE.

4. The MME sets the Active Time value of the corresponding UE to 0, transmits the TAU Accept message including the Active Time value set to 0 to the UE in response to the TAU Request message, and sets up the S1-U (namely, S1 bearer configuration) through the Initial Context Setup procedure.

As described above, the UE skips the operation for receiving a paging signal after downlink data are received as the MME sets the Active Time value to 0 so that the UE can reduce unnecessary power consumption.

The UE requests the Active Time value from the MME through the TAU Request message, and the MME can allocate the Active Time value to the UE through the TAU Accept message.

At this time, the TAU Accept message can be delivered being included in the Downlink NAS Transport message through the S1 signaling connection. In this case, the MME can transmit the Initial Context Setup Request message separately to the eNB to set up the S1-U between the eNB and the S-GW.

Also, the TAU Accept message can be delivered being included in the Initial Context Setup Request message through the S1 signaling connection. In this case, the TAU Accept message can be delivered to the eNB and at the same time, the S1-U can be set up between the eNB and the S-GW through the Initial Context Setup Request message of the UE.

Since the process for setting up the S1-U between the eNB and the S-GW is the same as in FIG. 8 or 10, detailed descriptions of which will be omitted.

5. The MME notifies UE-Reachable by transmitting a Monitoring Report to the HSS.

The HSS notifies the UE-Reachable by transmitting the Monitoring Report to the AS/SCS.

At this time, the MME may notify the UE-Reachable by transmitting the Monitoring Report directly to the AS/SCS.

6. Being notified by the HSS or the MME that the UE is reachable, the AS/SCS transmits downlink data to the corresponding UE by using an established (or set up) S1-U.

As described above, since the UE has received the TAU Accept message where the Active Time value is set to 0, the UE does not remain in the ECM-IDLE state after the S1 is released, but directly enters the sleep mode (for example, the PSM or a state where the UE is unreachable through paging in the eDRX mode) to disable the Access Stratum (AS) operation.

Through the procedure above, the AS can transmit downlink data smoothly to the UE in the sleep mode without discarding the downlink data even in the case where the reachable period of the UE is not known. In particular, in case downlink data are pending, the AS can command S1-U setup and at the same time, specify the Active Time value to 0, thereby enabling an optimized operation.

As described above, by setting up the S1-U beforehand, compared with the Initial Context Setup procedure through the paging procedure, not only the signaling overhead can be reduced, but also the situation where the UE again transits to the sleep mode and becomes unreachable can be avoided.

Meanwhile, the network node illustrated in FIG. 16 is only an example; the network node illustrated in FIG. 16 can be replaced with another network node, or it may include other network nodes.

Though FIG. 16 assumes that the Active Time of the UE is set to 0 and the S1-U is set up, it is equally possible that the Active Time is enlarged and the S1-U is set up through the paging procedure, which will be described below with reference to related drawings.

FIG. 17 illustrates a method for monitoring UE reachability according to one embodiment of the present invention.

With reference to FIG. 17, if the AS/SCS wants to transmit downlink data to the UE, the AS/SCS transmits a Monitoring Request message for requesting UE reachability monitoring to the HSS S1701.

The Monitoring Request message can include UE reachability related indication. For example, in case the AS/SCS wants to reliably transmit downlink data to the UE, the AS/SCS can incorporate the UE reachability related indication into the Monitoring Request message.

At this time, the UE reachability related indication is used to retain sufficient time (namely, to keep the UE staying in the reachable state) so that the AS/SCS can transmit downlink data to the UE after requesting the UE reachability monitoring.

For example, the UE reachability related indication can simply indicate the existence of downlink data as in the example of FIG. 16 (Downlink Data='yes').

Also, the UE reachability related indication may indicate the time period for which the UE stays reachable so that the AS/SCS can reliably deliver the downlink data to the UE.

The HSS which has received the Monitoring Request message from the AS/SCS transmits the UE Reachability Notification Request message to the MME S1702.

In case the Monitoring Request message received from the AS/SCS includes the UE reachability related indication, the HSS can transmit the UE reachability related indication by incorporating it into the UE Reachability Notification Request message.

At this time, the UE Reachability Notification Request message is only an example, and thus a message for monitoring UE reachability in a different format can also be used. However, for the convenience of descriptions, in what follows, it is assumed that the UE Reachability Notification Request message is used.

In case the UE Reachability Notification Request message includes the UE reachability related indication, the MME sets the Active Time value by using the UE reachability related indication if the UE applies the Power Saving Mode (PSM) S1703.

If the UE applies the eDRX, the MME delays S1 release triggering for a predetermined time period to prevent the corresponding UE from entering the extended DRX and falling into the unreachable state. In other words, the MME sets up the S1 release delay time by using the UE reachability related indication. Accordingly, in case the MME receives the UE reachability related indication, by delaying the S1 release time after successful TAU, the MME can guarantee the UE reachable time period during which the AS/SCS can send downlink data.

In other words, the UE reachability related indication is used for setting up the Active Time of the UE and/or delaying the S1 release.

For example, in case the MME receives an indication (i.e., UE reachability related indication) which indicates the existence of downlink data to be transmitted by the AS/SCS while configuring reachability of the corresponding UE, the MME can use the corresponding indication to adjust the Active Time value or to delay the S1 release.

Meanwhile, if the TAU procedure is triggered as the P-TAU timer of the UE in the sleep mode (in the PSM or in a state where the UE is unreachable through paging in the eDRX mode) is expired, the UE transmits the TAU Request message to the MME S1704.

At this time, the MME detects the UE reachability by receiving the TAU Request message of the UE.

Although FIG. 17 assumes for the purpose of convenience that the S1704 step is performed after the S1703 step, the order of performing the S1703 and S1704 steps can be changed.

The TAU Accept message is transmitted to the UE in response to the TAU Request message S1705.

At this time, the TAU Accept message includes the Active Time value set up in the S1703 step. In other words, the MME allocates the Active Time value set up in the S1803 step to the UE.

The UE requests the Active Time value from the MME through the TAU Request message, and the MME may allocate the Active Time value set up in the S1703 step to the UE through the TAU Accept message.

At this time, the TAU Accept message can be delivered being included in the Downlink NAS Transport message through the S1 signaling connection, and can be delivered being included in the Downlink Information Transfer message through RRC connection.

The MME notifies the HSS the the UE is reachable by transmitting the Monitoring Report S1706.

Although FIG. 17 assumes for the purpose of convenience that the S1706 step is performed after the S1705 step, the order of performing the S1705 and S1706 steps can be changed or the two steps can be performed simultaneously.

The HSS notifies the AS/SCS the the UE is reachable by transmitting the Monitoring Report S1707.

At this time, the MME may notify the AS/SCS that the UE is reachable by transporting the Monitoring Report; in this case, the S1707 step can be omitted.

The AS/SCS, being notified by the HSS or the MME that the UE is reachable, transmits downlink data to the corresponding UE.

As described above, in case the AS/SCS recognizes the UE's reachability and transmits data to be terminated to UE (namely, downlink data), the MME configures the Active Time to be a little long so that the MME can successfully deliver a paging signal. To put differently, by configuring the Active Time to be a little long, the MME keeps the Paging Proceed Flag from being cleared for a sufficient time period; the S-GW transmits the DDN which informs the MME of data transmission and the MME transmits a paging request message so that the MME can successfully transmit the corresponding paging signal to the UE. In other words, after receiving a request for UE reachability monitoring from the AS/SCS, the MME keeps the Active Time for a sufficient time period so that the AS/SCS can transmit downlink data. Also, in case the corresponding UE applies the eDRX, the MME delays the S1 release so that the UE's reachability can be guaranteed for a predetermined time period.

Also, the network node illustrated in FIG. 17 is only an example; the network node illustrated in FIG. 17 can be replaced with another network node, or it may include other network nodes.

FIG. 18 illustrates a method for monitoring UE reachability according to one embodiment of the present invention.

With reference to FIG. 18, in case the AS/SCS wants to transmit downlink data to the UE, the AS/SCS transmits a Monitoring Request message for requesting UE reachability monitoring to the HSS S1801.

The Monitoring Request message can include P-TAU timer configuration.

At this time, the P-TAU timer configuration specifies the period value (namely, P-TAU timer value) at which the AS/SCS wants to contact the UE afterwards.

The HSS which has received the Monitoring Request message from the AS/SCS transmits the UE Reachability Notification Request to the MME S1802.

In case the Monitoring Request message received from the AS/SCS includes the P-TAU timer configuration, the HSS can transmit the P-TAU timer configuration by incorporating it into the UE Reachability Notification Request message.

At this time, the UE Reachability Notification Request message is only an example, and thus a message for monitoring UE reachability in a different format can also be used. However, for the convenience of descriptions, in what follows, it is assumed that the UE Reachability Notification Request message is used.

In case the UE Reachability Notification Request message includes P-TAU timer configuration, the MME sets up the P-TAU timer of the corresponding UE by using the P-TAU timer configuration S1803.

In other words, the MME sets up the P-TAU timer of the corresponding UE by using the P-TAU timer configuration, and the MME applies the P-TAU timer set up by the MME at the P-TAU procedure.

Although FIG. 18 assumes the case where the MME sets up the P-TAU timer, the HSS may set up the P-TAU timer.

In other words, if the HSS receives the Monitoring Request message including the P-TAU timer configuration from the AS/SCS in the previous S1801 step, the HSS can set up the P-TAU timer of the corresponding UE by using the P-TAU timer configuration. And the HSS can transmit the P-TAU timer set up by the HSS to the MME. The MME, which has received the P-TAU timer set up by the HSS, applies the received P-TAU timer at the P-TAU procedure.

In what follows, for the convenience of descriptions, it is assumed that the MME sets up the P-TAU timer.

Meanwhile, if the P-TAU timer of the UE in the sleep mode (in the PSM or in a state where the UE is unreachable through paging in the eDRX mode) is expired, the UE transmits the TAU Request message to the MME S1804.

At this time, the MME detects UE reachability by receiving the TAU Request message of the UE.

Although FIG. 18 assumes for the purpose of convenience that the S1804 step is performed after the S1803 step, the order of performing the S1803 and S1804 steps can be changed.

The MME transmits the TAU Accept message to the UE in response to the TAU Request message S1805.

At this time, the TAU Accept message includes the P-TAU timer value set up in the S1803 step. In other words, the MME allocates the P-TAU timer value set up in the S1803 step to the UE.

The UE requests the P-TAU timer value from the MME through the TAU Request message, and the MME may allocate the P-TAU timer value set up in the S1803 step to the UE through the TAU Accept message.

At this time, the TAU Accept message can be delivered being included in the Downlink NAS Transport message through S1 signaling connection and can be delivered being included in the DL information Transfer message through RRC connection.

The MME notifies the HSS that the UE is reachable by transmitting the Monitoring Report S1806.

The HSS notifies the AS/SCS that the UE is reachable by transmitting the Monitoring Report S1807.

At this time, the MME may notify the AS/SCS that the UE is reachable by transporting the Monitoring Report; in this case, the S1807 step can be omitted.

The AS/SCS, being notified by the HSS or the MME that the UE is reachable, transmits downlink data to the corresponding UE.

As described above, in case the UE is reachable through the P-TAU, the UE can enter the sleep mode (for example, the PSM or a state where the UE is unreachable in the eDRX mode) again after successful data transmission and reception.

And the UE maintains the sleep mode by switching off the Access Stratum (AS) until the P-TAU timer (namely, the P-TAU timer set up by the MME/HSS according to the P-TAU timer period received from the AS/SCS) set up by the AS/SCS is expired and if the P-TAU timer is expired, the UE wakes up to perform the P-TAU procedure.

In other words, through this procedure, the synchronized wake-up between the AS/SCS and the UE enables transmission and reception of Mobile terminated Calls, thereby maximizing the power saving effect of the UE and at the same time, minimizing data delivery delay of the AS/SCS.

Also, the network node illustrated in FIG. 18 is only an example; the network node illustrated in FIG. 18 can be replaced with another network node, or it may include other network nodes.

Meanwhile, FIGS. 16 to 18 illustrate the TAU procedure as a method for allocating an Active Time and/or P-TAU timer value to the UE. The TAU procedure is only an example, and the Active Time and/or P-TAU timer value can be allocated to the UE by using the NAS procedure which is triggered by the UE like the Attach procedure.

Currently, only through the NAS procedure (TAU, Attach procedure, and so on) triggered by the UE, the Active Time and the P-TAU timer value used by the UE can be changed. Therefore, in case the AS/SCS requests change of the Active Time and/or the P-TAU timer value of the UE for the next downlink data transmission, a problem may arise that the UE does not use the corresponding value immediately after switching to the ECM-IDLE mode, but the Active Time and/or the P-TAU timer value newly set up in the NAS procedure (TAU, Attach procedure, and so on) triggered by the UE after the mode switching can be updated. In other words, in case the UE does not trigger the NAS procedure, the UE cannot be updated with the Active Time and/or the P-TAU timer value newly set up as described above.

Therefore, there needs a configuration method which enables the P-TAU timer set up by the AS/SCS and the Active Time (or period) reachable after the UE releases the S1 bearer to be applied immediately to the UE. Accordingly, the present invention provides a method for applying configured (or changed) P-TAU timer and/or Active Time value to the UE.

A new NAS message can be defined, by which the MME can configure PSM (or eDRX mode)-related parameters (for example, configured (or changed) P-TAU timer and/or Active Time) during a Service Request setup process. For example, a Service Request Accept message can be defined.

The Service Request Accept message can be transmitted to the UE by the MME in response to the Service Request message. Therefore, a Service Request procedure is initiated as the UE transmits the Service Request message to the MME (see FIG. 10), and the MME can allocate PSM (or eDRX mode)-related parameters (for example, configured (or changed) P-TAU timer and/or Active Time) to the UE by transmitting the Service Request Accept message to the UE during the Service Request procedure.

Also, if the MME sets up the eNB with the new PSM (or eDRX mode)-related parameters (for example, configured (or changed) P-TAU timer and/or Active Time) by using the S1AP message while the S1 bearer is in a released state, the eNB can transmit the corresponding parameters to the UE through an RRC message (for example, RRC Connection Reconfiguration message). The above scheme can be applied when the MME activates the corresponding UE (namely, switches the UE to a reachable state) from the sleep mode (in the PSM or in a state where the UE is unreachable through paging in the eDRX mode).

Also, a message can be defined, by which the MME commands the UE to trigger the TAU procedure. For example, a TAU Indication message can be defined. The MME can command the UE to immediately perform the TAU by transmitting the TAU Indication message to the UE; as in the examples of FIGS. 16 to 18, the MME can allocate PSM (or eDRX mode)-related parameters (for example, configured (or changed) P-TAU timer and/or Active Time) to the UE through the TAU Accept message.

FIG. 19 illustrates a method for monitoring UE reachability according to one embodiment of the present invention.

With reference to FIG. 19, a network node (for example, MME) receives a message for monitoring UE reachability from another network node (for example, HSS) S1901.

At this time, the message for monitoring UE reachability can include UE reachability related indication.

For example, the UE Reachability Notification Request message may be used as a message for UE monitoring reachability, but a message for monitoring UE reachability in a different format may also be used.

In case the message for monitoring UE reachability includes the UE reachability related indication, the network node (for example, MME) sets up the Active Time and/or S1 release delay time of the UE by using the UE reachability related indication S1902.

More specifically, if the UE applies the Power Saving Mode (PSM), the network node (for example, MME) can set up the Active Time value by using the UE reachability related indication.

Also, if the UE applies the eDRX, the network node (for example, MME) can set up the S1 release delay time to delay S1 release triggering by using the UE reachability related indication.

The network node (for example, MME) applies the Active Time and/or S1 release delay time set up in the S1902 step, S1903.

At this time, in case the network node (for example, MME) sets up the Active Time, the Active Time can be used by allocating the Active Time to the UE. For example, if the TAU procedure is triggered as the P-TAU timer is expired, the network node (for example, MME) can allocate the Active Time to the UE through the TAU Accept message.

Also, in case the network node (for example, MME) sets up the S1 release delay time, for example, after the TAU procedure is completed, the network node (for example, MME) can initiate the S1 release procedure (for example, the step 9 to 11 of FIG. 9) after the S1 release delay time.

FIG. 20 illustrates a method for monitoring UE reachability according to one embodiment of the present invention.

With reference to FIG. 20, a network node (for example, MME) receives a message for monitoring UE reachability from another network node (for example, HSS) S2001.

The message for monitoring UE reachability can include P-TAU timer configuration. At this time, the P-TAU timer configuration specifies the period value (namely, P-TAU timer value) at which the AS/SCS wants to contact the UE afterwards.

For example, the UE Reachability Notification Request message may be used as a message for monitoring UE reachability, but a message for monitoring UE reachability in a different format may also be used.

In case the message for monitoring UE reachability includes P-TAU timer configuration, the network node (for example, MME) applies a P-TAU timer set up by using the P-TAU timer configuration at the P-TAU procedure S2002.

At this time, the network node which has received a message for monitoring the UE reachability from the S2001 step (for example, MME) may set up the P-TAU timer, but a network node different (for example, HSS) from the above may be used for the set-up.

At this time, the network node (for example, MME) can apply the P-TAU timer by allocating the P-TAU timer to the UE. For example, if the TAU procedure is triggered as the P-TAU timer is expired, the network node (for example, MME) can allocate the P-TAU timer value to the UE through the TAU Accept message.

Overview of Devices to which the Present Invention can be Applied

FIG. 21 illustrates a block diagram of a communication device according to one embodiment of the present invention.

With reference to FIG. 21, a wireless communication system comprises a network node 2110 and a plurality of UEs 2120.

A network node 2110 comprises a processor 2111, memory 2112, and communication module 2113. The processor 2111 implements proposed functions, processes and/or methods proposed through FIG. 1 to FIG. 20. The processor 2111 can implement layers of wired/wireless interface protocol. The memory 2112, being connected to the processor 2111, stores various types of information for driving the processor 2111. The communication module 2113, being connected to the processor 2111, transmits and/or receives wired/wireless signals. Examples of the network node 2110 include an eNB, MME, HSS, AS, SCS, and so on. In particular, in case the network node 2110 is an eNB, the communication module 2113 can include an Radio Frequency (RF) unit for transmitting/receiving a radio signal.

The UE 2120 comprises a processor 2121, memory 2122, and communication module (or RF unit) 2123. The processor 2121 implements proposed functions, processes and/or methods proposed through FIG. 1 to FIG. 20. The processor 2121 can implement layers of wired/wireless interface protocol. The memory 2122, being connected to the processor 2121, stores various types of information for driving the processor 2121. The communication module 2123, being connected to the processor 2121, transmits and/or receives wired/wireless signals.

The memory 2112, 2122 can be installed inside or outside the processor 2111, 2121 and can be connected to the processor 2111, 2121 through various well-known means. Also, the network node 2110 (in the case of an eNB) and/or the UE 2120 can have a single antenna or multiple antennas.

The embodiments described above are a combination of constituting elements and features of the present invention in particular forms. Unless otherwise specified, each constituting element or feature should be regarded to be selective. Each constituting element or feature can be embodied solely without being combined with other constituting element or feature. It is also possible to construct embodiments of the present invention by combining part of constituting elements and/or features. The order of operations illustrated in the embodiments of the present invention can be changed. Part of a structure or feature of an embodiment can be included by another embodiment or replaced with the corresponding structure or feature of another embodiment. It should be clear that embodiments can also be constructed by combining those claims revealing no explicit reference relationship with one another, or the combination can be included as a new claim in a revised application of the present invention afterwards.

Embodiments according to the present invention can be realized by various means, for example, hardware, firmware, software, or a combination thereof. In the case of hardware implementation, the embodiments of the present invention can be implemented by one or more of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, and the like.

In the case of firmware or software implementation, methods according to the embodiment of the present invention can be implemented in the form of a module, procedure, or function performing operations described above. Software codes can be stored in a memory unit and executed by a processor. The memory unit, being located inside or outside the processor, can communicate data with the processor through various means known in the fields of the art.

It should be clearly understood by those skilled in the art that the present invention can be realized in a different, particular form as long as the present invention retains the essential features of the present invention. Therefore, the detailed description above should not be interpreted limitedly from all aspects of the invention but should be regarded as an illustration. The technical scope of the invention should be determined through a reasonable interpretation of the appended claims; all the possible modifications of the present invention within an equivalent scope of the present invention should be understood to belong to the technical scope of the present invention.

INDUSTRIAL APPLICABILITY

This document discloses a method for monitoring UE reachability in a wireless communication system with examples based on the 3GPP LTE/LTE-A system; however, the present invention can be applied to various other types of wireless communication systems in addition to the 3GPP LTE/LTE-A system.

The invention claimed is:

1. A method for monitoring User Equipment (UE) reachability, by a Mobile Management Entity (MME), in a wireless communication system, the method comprising:
    receiving a message related to UE reachability from a Home Subscriber Server (HSS);
    when a UE reachability related indication is included in the message, setting an Active Time for the UE using the UE reachability related indication;
    monitoring the UE when the UE will become reachable; and
    based on the monitoring, reporting a monitoring report regarding the UE reachability to the server,
    wherein the Active Time is allocated to the UE, and
    wherein the UE reachability related indication is used for setting the Active Time of the UE so that the UE stays reachable to allow the server to deliver a downlink data to the UE after the server receives the monitoring report.

2. The method of claim 1, wherein the UE reachability related indication indicates that the server has downlink data to transmit to the UE.

3. The method of claim 1, wherein the UE reachability related indication is received from the HSS, which receives the UE reachability related indication from a Service Capability Server or an Application Server which has the downlink data to transmit to the UE.

4. The method of claim 1, wherein the Active Time is set to '0'.

5. The method of claim 1, further comprising transmitting, by the MME, an Initial Context Setup Request message to an evolved-Node B (eNB) to establish an S1 bearer.

6. The method of claim 1, wherein a set Active Time is transmitted through a Tracking Area Update Accept message, Attach Accept message, or Service Request Accept message.

7. A Mobile Management Entity (MME) for monitoring User Equipment (UE) reachability in a wireless communication system, the MME comprising:
   a communication module for transmitting/receiving signals; and
   a processor for controlling the communication module,
   wherein the processor is configured to:
   receive a message related to UE reachability from a Home Subscriber Server (HSS);
   when a UE reachability related indication is included in the message, setting an Active Time for the UE using the UE reachability related indication;
   monitoring the UE when the UE will become reachable; and
   based on the monitoring, reporting a monitoring report regarding the UE reachability to the server,
   wherein the Active Time is allocated to the UE, and
   wherein the UE reachability related indication is used for setting the Active Time of the UE so that the UE stays reachable to allow the server to deliver a downlink data to the UE after the server receives the monitoring report.

* * * * *